United States Patent
Sasaki

(10) Patent No.: US 10,186,699 B2
(45) Date of Patent: Jan. 22, 2019

(54) LAMINATE FOR NON-AQUEOUS SECONDARY BATTERY, AND METHOD FOR MANUFACTURING NON-AQUEOUS SECONDARY BATTERY MEMBER

(71) Applicant: ZEON CORPORATION, Chiyoda-ku, Tokyo (JP)

(72) Inventor: Tomokazu Sasaki, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 18 days.

(21) Appl. No.: 15/500,975

(22) PCT Filed: Aug. 12, 2015

(86) PCT No.: PCT/JP2015/004042
§ 371 (c)(1),
(2) Date: Feb. 1, 2017

(87) PCT Pub. No.: WO2016/031163
PCT Pub. Date: Mar. 3, 2016

(65) Prior Publication Data
US 2017/0214022 A1     Jul. 27, 2017

(30) Foreign Application Priority Data
Aug. 28, 2014 (JP) ................................. 2014-174213

(51) Int. Cl.
*H01M 2/16* (2006.01)
*H01M 2/14* (2006.01)
(Continued)

(52) U.S. Cl.
CPC ......... *H01M 2/1653* (2013.01); *H01M 2/145* (2013.01); *H01M 2/1673* (2013.01);
(Continued)

(58) Field of Classification Search
None
See application file for complete search history.

(56) References Cited

U.S. PATENT DOCUMENTS

2016/0141575 A1* 5/2016 Sasaki ................ H01M 2/1653
                                                          429/144
2017/0200932 A1* 7/2017 Sasaki ................... H01M 2/166

FOREIGN PATENT DOCUMENTS

| EP | 2485302 A1 | 8/2012 |
|---|---|---|
| EP | 2835844 A1 | 2/2015 |

(Continued)

OTHER PUBLICATIONS

Feb. 28, 2017, International Preliminary Report on Patentability issued in the International Patent Application No. PCT/JP2015/004042.

*Primary Examiner* — Jonathan Crepeau
(74) *Attorney, Agent, or Firm* — Kenja IP Law PC

(57) ABSTRACT

Disclosed is a laminate for non-aqueous secondary battery which includes a functional layer that has superior transferability and may exert high function. The disclosed laminate includes a releasable substrate having a water contact angle of 70° or more, and a functional layer on the releasable substrate. The functional layer includes organic particles and a binder. The organic particles each have a core-shell structure having a core and a shell that partially covers an outer surface of the core. The core is made of polymer having a degree of swelling in electrolysis solution of 5 times or more to 30 times or less. The shell is made of polymer having a degree of swelling in electrolysis solution of greater than 1 time to 4 times or less.

4 Claims, 1 Drawing Sheet

(51) Int. Cl.
*H01M 4/139* (2010.01)
*H01M 4/13* (2010.01)
*H01M 4/525* (2010.01)
*H01M 4/587* (2010.01)
*H01M 10/0525* (2010.01)
*H01M 4/133* (2010.01)
*H01M 4/131* (2010.01)

(52) U.S. Cl.
CPC .............. *H01M 4/13* (2013.01); *H01M 4/139* (2013.01); *H01M 4/525* (2013.01); *H01M 4/587* (2013.01); *H01M 10/0525* (2013.01); *H01M 4/131* (2013.01); *H01M 4/133* (2013.01)

(56) References Cited

FOREIGN PATENT DOCUMENTS

| | | | |
|---|---|---|---|
| JP | 2012204303 A | | 10/2012 |
| JP | 2013145763 A | | 7/2013 |
| WO | 2011040474 A1 | | 4/2011 |
| WO | 2013151144 A1 | | 10/2013 |
| WO | WO 2015/005151 | * | 1/2015 |

\* cited by examiner

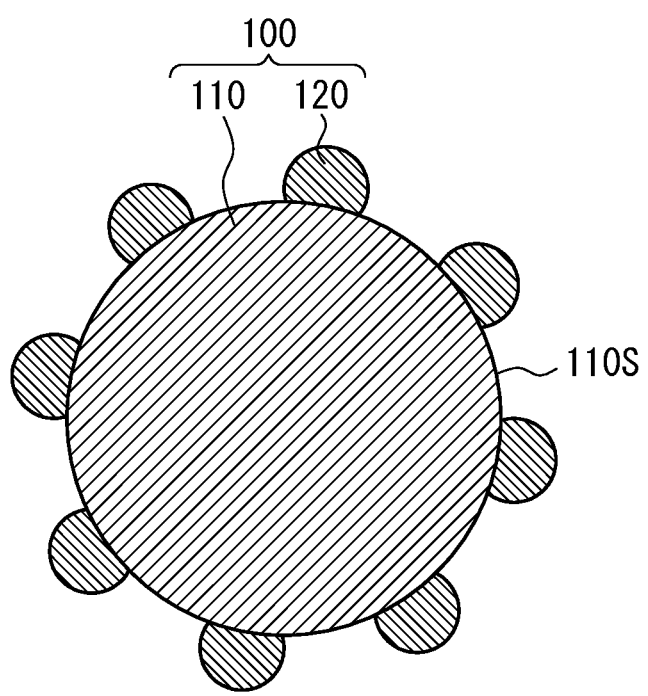

LAMINATE FOR NON-AQUEOUS SECONDARY BATTERY, AND METHOD FOR MANUFACTURING NON-AQUEOUS SECONDARY BATTERY MEMBER

TECHNICAL FIELD

This disclosure relates to a laminate for non-aqueous secondary battery, and a method of manufacturing a non-aqueous secondary battery member, more particularly to a laminate for non-aqueous secondary battery that includes a functional layer provided on a releasable substrate, and a method of manufacturing a non-secondary battery member wherein a functional layer is transferred from a laminate for non-aqueous secondary battery to a substrate for non-aqueous secondary battery.

BACKGROUND

Non-aqueous secondary batteries (hereinafter occasionally simply referred to as "secondary batteries") such as lithium ion secondary batteries are small and light, high in energy density, and capable of repeated cycles of charge and discharge. For such characteristics, secondary batteries are used in a wide variety of applications. A secondary battery generally includes non-aqueous secondary battery members such as a positive electrode, a negative electrode, and a separator for separating the positive electrode and negative electrode from each other to prevent a short-circuit between them.

In recent years, secondary battery members have been used that include a substrate for non-aqueous secondary battery, and a functional layer (e.g., a porous membrane layer for improving heat resistance and strength, or an adhesive layer for improving adhesion between secondary battery members) formed on the substrate using a slurry composition for non-aqueous secondary battery functional layer (hereinafter occasionally simply referred to as a "functional layer composition") containing a binder component and a dispersion medium such as water.

Specific examples of secondary battery members that have been used in the art are electrodes that include an electrode substrate, which has an electrode mixed material layer provided on a current collector, and a functional layer formed on the electrode substrate; and separators that include a separator substrate and a functional layer formed on the separator substrate (see, e.g., PTLS 1 and 2).

PTL 1 discloses a porous membrane layer to be formed on an electrode substrate or separator substrate and reports that a porous membrane layer that comprises a binder (made of polymer particles having heterogeneous phase structure consisting of a core layer composed of a polymer of a vinyl monomer component, and of a shell layer composed of a polymer of a hydrophilic functional group-containing monomer component) and non-conductive particles exhibits superior strength as well as exerts high lithium ion diffusivity in lithium ion secondary batteries.

PTL 2 reports that a separator that includes a separator substrate, a porous membrane layer containing non-conductive particles and binder formed on the separator substrate, and an adhesive layer containing a particulate polymer having a specific glass-transition temperature formed on the porous membrane layer exhibits good adhesion to electrodes allowing a secondary battery to exert superior high-temperature cycle characteristics and rate characteristics.

CITATION LIST

Patent Literature

PTL 1: WO2011040474A
PTL 2: WO2013151144A

SUMMARY

Technical Problem

On the other hand, the conventional method of manufacturing a secondary battery member that involves provision of a functional layer on a substrate for secondary battery has heretofore used a technique of temporarily providing a functional layer on a releasable substrate to manufacture a laminate for non-aqueous secondary battery followed by bonding of the laminate to the substrate for secondary battery for transfer of the functional layer onto the substrate. Such a technique requires suitable transfer of the functional layer provided on the releasable substrate onto the substrate for secondary battery to reduce the amount of functional layer remaining on the releasable substrate as much as possible while allowing the transferred functional layer to exert superior performance.

It has been difficult for the foregoing prior art functional layer to ensure transferability and adhesion in electrolysis solution at the same time, when the functional layer is temporarily provided on a releasable substrate and then transferred onto a substrate for secondary battery. Further, in this case, it is not possible to allow a secondary battery to sufficiently exert superior electrical characteristics (e.g., high-temperature cycle characteristics and low-temperature output characteristics).

In particular, binder components such as polymer particles and particulate polymers contained in the prior art functional layer have inferior adhesion in electrolysis solution compared to when they are dried. Increasing the amounts of binder components to ensure that the prior art functional layer exhibits adhesion in electrolysis solution compromises the transferability of the functional layer due to excess increases in adhesion to a releasable substrate, resulting in failure to allow the functional layer to exert superior performance.

Accordingly, the prior art has room for improvement in ensuring, when temporarily providing a functional layer on a releasable layer to manufacture a laminate for secondary battery and forming a functional layer on a substrate for secondary battery using the laminate, both transferability and adhesion in electrolysis of the functional layer in a well-balanced manner to improve electrical characteristics of a secondary battery.

It would therefore be helpful to provide a laminate for non-aqueous secondary battery which includes a functional layer that has superior transferability and may exert high function in a non-aqueous secondary battery.

It would also be helpful to provide a method of manufacturing, using the laminate for non-aqueous secondary battery, a non-aqueous secondary battery member that may allow a secondary battery to exert superior electrical characteristics.

Solution to Problem

The inventor conducted extensive studies to solve the problem described above. The inventor discovered that the use of a laminate for secondary battery that includes a releasable substrate whose water contact angle is at least a specific value and a functional layer formed on the releasable substrate, wherein the functional layer contains a binder and organic particles each having a specific core-shell structure whose core and shell have specific values for degree of swelling in electrolysis solution, results in high functional layer transferability, superior adhesion in electrolysis solution of the transferred functional layer, and superior electrical characteristics of a secondary battery. This discovery led to the present disclosure.

Specifically, this disclosure is aimed at advantageously solving the aforementioned problem, and the disclosed laminate for non-aqueous secondary battery includes a releasable substrate and a functional layer adjacently disposed on the releasable substrate, wherein the functional layer comprises organic particles and a binder, each organic particle has a core-shell structure having a core and a shell that partially covers the outer surface of the core, the core is made of polymer having a degree of swelling in electrolysis solution of 5 times or more to 30 times or less, the shell is made of polymer having a degree of swelling in electrolysis solution of greater than 1 time to 4 times or less, and the releasable substrate has a water contact angle of 70° or more. Thus, when a laminate for secondary battery is used that includes a releasable substrate whose water contact angle is at least a specific value and a functional layer provided on the releasable substrate wherein the functional layer comprises a binder and organic particles each having a specific core-shell structure whose core and shell have specific values for degree of swelling in electrolysis solution, it is possible to suitably transfer a high-performance functional layer onto a substrate for non-aqueous secondary battery.

The "degree of swelling in electrolysis solution" of the polymers of the core and shell of the organic particles and the "water contact angle" of the releasable substrate herein can be measured using the measurement methods described in the Examples of this disclosure.

In the disclosed laminate for non-aqueous secondary battery, the core polymer preferably has a glass-transition temperature of 0° C. or more to 150° C. or less, and the shell polymer preferably has a glass-transition temperature of 50° C. or more to 200° C. or less. When the glass-transition temperatures of the core and shell polymers fall within the respective ranges described above, it is possible to further improve adhesion in electrolysis solution of the functional layer and high-temperature cycle characteristics and low-temperature output characteristics of a secondary battery.

The "glass-transition temperature" of the core and shell of the organic particles herein can be measured using the measurement method described in the Examples of this disclosure.

Further, in the disclosed laminate for non-aqueous secondary battery, the binder preferably has a glass-transition temperature of −50° C. or more to 25° C. or less. When the glass-transition temperatures of the binder falls within the range, it is possible to further improve the functional layer transferability and low-temperature output characteristics of a secondary battery.

The "glass-transition temperature" of the binder herein can be measured using the measurement method described in the Examples of this disclosure.

This disclosure is aimed at advantageously solving the aforementioned problem, and the disclosed method of manufacturing a non-aqueous secondary battery member is a method of manufacturing a non-aqueous secondary battery member that includes a functional layer formed on a substrate for non-aqueous secondary battery, the method including: disposing a laminate for non-aqueous secondary battery that includes a releasable substrate and the functional layer adjacently disposed on the releasable substrate such that the functional layer is adjacent to the substrate for non-aqueous secondary battery, and bonding the functional layer to the substrate for non-aqueous secondary battery; and peeling the releasable substrate from the functional layer, wherein the functional layer comprises organic particles and a binder; the organic particles each have a core-shell structure having a core and a shell that partially covers the outer surface of the core, the core is made of polymer having a degree of swelling in electrolysis solution of 5 times or more to 30 times or less, the shell is made of polymer having a degree of swelling in electrolysis solution of greater than 1 time to 4 times or less, and the releasable substrate has a water contact angle of 70° or more. Thus, when a laminate for secondary battery is used that includes a releasable substrate whose water contact angle is at least a specific value and a functional layer provided on the releasable substrate wherein the functional layer comprises a binder and organic particles each having a specific core-shell structure whose core and shell have specific values for degree of swelling in electrolysis solution, it is possible to manufacture a secondary battery member that can allow a secondary battery to exert superior electrical characteristics.

Advantageous Effect

According to the present disclosure, it is possible to provide a laminate for non-aqueous secondary battery which includes a functional layer that has superior transferability and may exert high function in a non-aqueous secondary battery.

According to the present disclosure, it is also possible to provide a method of manufacturing, using the laminate for non-aqueous secondary battery, a non-aqueous secondary battery member that may allow a secondary battery to exert superior electrical characteristics.

BRIEF DESCRIPTION OF THE DRAWINGS

In the accompanying drawings:
FIG. 1 is a cross-sectional view schematically illustrating a structure of an example of an organic particle contained in the functional layer of the disclosed laminate for non-aqueous secondary battery.

DETAILED DESCRIPTION

Embodiments will now be described in detail.
The disclosed laminate for non-aqueous secondary battery is used in applications where a functional layer is transferred onto a substrate for non-aqueous secondary battery for the manufacture of a non-aqueous secondary battery member having a functional layer. The disclosed method of manufacturing a non-aqueous secondary battery member is a method of manufacturing, using the laminate for non-aqueous secondary battery, a non-aqueous secondary battery member having a functional layer and a substrate for non-aqueous secondary battery.

The functional layer may be a porous membrane layer for improving heat resistance and strength of secondary battery members such as separators and electrodes, may be an adhesive layer for bonding together secondary battery members, or may be a layer that exerts functions of both the porous membrane layer and adhesive layer.

(Laminate for Non-Aqueous Secondary Battery)

The laminate for non-aqueous secondary battery includes a releasable substrate and a functional layer disposed so as to contact the releasable layer, wherein the functional layer contains at least organic particles and binder. The releasable substrate has a water contact angle of at least a specific value, organic particles and binder are used in combination in the functional layer, and each organic particle has a specific core-shell structure.

Using the disclosed laminate for non-aqueous secondary battery, it is possible to achieve suitable transfer of a functional layer onto a substrate for non-aqueous secondary battery, confer superior adhesion in electrolysis solution to the transferred functional layer, and allow a secondary battery to exert superior electrical characteristics. In addition, using the disclosed laminate for non-aqueous secondary battery, it is possible to manufacture a secondary battery member having a functional layer even when no device is available for applying functional layer compositions. Further, using the disclosed laminate for non-aqueous secondary battery, it is possible to easily provide a functional layer even on substrates for secondary battery onto which functional layer compositions cannot be easily applied (e.g., non-woven fabrics with large pore size).

<Functional Layer>

The functional layer constituting the laminate for secondary battery contains organic particles and binder as described above, and optionally may contain non-conductive particles (except for those corresponding to organic particles and binder) and additional components. The functional layer is transferred onto a substrate for secondary battery to constitute a secondary battery member such as a separator or an electrode.

«Organic Particles»

In a functional layer that functions as an adhesive layer, organic particles serve as an adhesive that firmly bonds together secondary battery members, e.g., a separator and an electrode, in electrolysis solution. In a functional layer that functions as a porous membrane film, organic particles serve as a binder that firmly bonds together non-conductive particles in electrolysis solution. The organic particles each have a core-shell structure having a core and a shell partially covering the outer surface of the core, wherein the core is made of polymer having a degree of swelling in electrolysis solution of 5 times or more to 30 times or less, and the shell is made of polymer having a degree of swelling in electrolysis solution of greater than 1 time to 4 times or less.

Organic particles having the structure and properties described above exert superior adhesion in electrolysis solution and can well improve electrical characteristics of a non-aqueous secondary battery provided with a functional layer. There are cases wherein secondary battery members (e.g., electrode and separator) that include a functional layer formed on an electrode substrate or separator substrate are stored and transported in a spirally wound form. Battery members having the functional layer are less likely to undergo blocking (gluing of battery members to one another via functional layers) even when spirally wound and therefore are superior in handleability.

Although it remains elusive why the organic particles provide a superior effect such as that described above, the reason is presumed to be as follows.

Specifically, the shell polymer of the organic particle swells in contact with electrolysis solution. At this time, due for example to activation of the functional groups of the swollen polymer in the shell followed by chemical or electrical interactions with functional groups present on the surface of the substrate for secondary battery (e.g., separator substrate or electrode substrate that contacts the functional layer), the shell can be firmly bound to the secondary battery member and non-conductive particles in electrolysis solution. Thus, it is presumed that a functional layer containing such organic particles enables secondary battery members (e.g., separator and electrode) to be firmly bound to one another in electrolysis solution, as well as enables non-conductive particles to be firmly bound to one another in electrolysis solution to increase the strength and heat resistance of the functional layer.

Further, since the use of a functional layer containing the organic particles as an adhesive layer can provide firm adhesion between a separator and an electrode in electrolysis solution as described above, in a secondary battery including such a functional layer, space is not easily formed between the secondary battery members (e.g., between separator and electrode) bonded together with the functional layer. Thus, in a secondary battery including a functional layer containing the organic particles, the distance between the positive and negative electrodes does not easily increase in the secondary battery, the internal resistance of the secondary battery can be lowered, and the reaction field of electrochemical reactions in the electrode does not easily become non-uniform. Further, in the secondary battery, space is not easily formed between the separator and electrode even after repeated cycles of charge and discharge, and thus the battery capacity does not easily decrease. It is assumed that this achieves superior bulging resistance, superior high-temperature cycle characteristics, and the like.

Further, the core polymer of the organic particle greatly swells in contact with electrolysis solution. With the polymer greatly swollen in electrolysis solution, intermolecular space of the polymer becomes large allowing ions to easily pass through between the molecules. Also, the core polymer of the organic particle is not completely covered with the shell. Thus, ions are more likely to pass through the core in electrolysis solution, and therefore the organic particles can exert high ion diffusivity. Accordingly, using the organic particles described above, it is possible to suppress increases in resistance due to the functional layer to suppress reductions in electrical characteristics such as low-temperature output characteristics.

When not swollen in electrolysis solution, the shell polymer does not generally exhibit adhesion but does so only after swollen in electrolysis solution. For this reason, the organic particles do not generally exert adhesion when they are not swollen in electrolysis solution. The functional layer containing the organic particles therefore does not exert great adhesion when not swollen in electrolysis solution, and it is assumed that a substrate such as a separator substrate provided with the functional layer does not easily undergo blocking even when stacked. It is not that the organic particles do not exert adhesion at all as long as they do not swell in contact with electrolysis solution; they may exert adhesion when, for example, heated to a given temperature or higher (e.g., 50° C. or higher).

[Structure of Organic Particle]

Each organic particle has a core-shell structure having a core and a shell that covers the outer surface of the core. The shell partially covers the outer surface of the core. Specifically, although the shell of the organic particle covers the outer surface of the core, it does not cover the entire outer surface of the core. Even when the core outer surface seems to be completely covered by a shell by its appearance, the shell is equated to a shell that partially covers the core outer surface in cases where the shell has a pore that communicates between inside and outside of the shell. Accordingly, the above-described organic particles encompass, for example, such organic particles with a shell having a fine pore that communicates from the shell outer surface (i.e., peripheral surface of the organic particle) to the core outer surface.

Specifically, referring to FIG. 1 which illustrates a cross-sectional structure of an example of an organic particle, an organic particle 100 has a core-shell structure having a core 110 and a shell 120. The core 110 refers to a portion which is present inward from the shell 120 in the organic particle 100. The shell 120 refers to a portion which covers an outer surface 110S of the core 110, and normally refers to an outermost portion of the organic particle 100. The shell 120 does not cover the entire outer surface 110S of the core 110, but partially covers the outer surface 110S of the core 110.

In the organic particles, the average ratio of shell coverage on the core outer surface (ratio of coverage) is preferably 10% or more, more preferably 20% or more, still more preferably 30% or more, preferably 95% or less, more preferably 90% or less, and still more preferably 70% or less. By setting the ratio of coverage to be at least the lower limit value of the range described above, it is possible to increase adhesion of the organic particles in electrolysis solution and thus to further improve high-temperature cycle characteristics of a secondary battery. In this case it is also possible to prevent blocking of the functional layer. By setting the ratio of coverage to be no greater than the upper limit value of the range described above, ion diffusivity of the functional layer increases and thus it is possible to further improve low-temperature output characteristics of a secondary battery.

The average ratio of shell coverage on the core outer surface may be measured by the observation of the cross-sectional structures of organic particles. Specifically, measurements may be made by the method described below.

First, organic particles are fully dispersed in room temperature-curable epoxy resin and then embedded to form a block piece containing the organic particles. A thin slice of 80-200 nm thickness is then cut from the block piece using a microtome equipped with a diamond blade to prepare a measurement specimen. Thereafter, where necessary, the measurement specimen is subjected to dying treatment using, for example, ruthenium tetroxide or osmium tetroxide.

The measurement specimen is then loaded into a transmission electron microscope (TEM), and an image of cross-sectional structures of the organic particles is captured. The magnification of the electron microscope is preferably such that a cross-section of one organic particle is within the field of view. Specifically, the magnification is preferably on the order of 10,000×.

In the cross-sectional structure of a captured organic particle image, length D1 (circumferential length of core, corresponding to the core outer surface) and length D2 (length of a part where the core outer surface contacts the shell) are measured. Using lengths D1 and D2 measured, the ratio of shell coverage on the core outer surface of that organic particle (Rc) is calculated using the following Equation (1):

$$\text{Ratio of coverage } Rc\ (\%) = (D2/D1) \times 100 \quad (1)$$

The ratio of coverage (Rc) is measured for 20 or more organic particles, and an average the measured ratios of coverage is calculated to find an average ratio of shell coverage on the core outer surface (ratio of coverage).

Although the ratio of coverage (Rc) can be calculated manually based on cross-sectional structures of organic particles, calculation can be made using commercially available image analysis software. For example, "AnalySIS Pro" (Olympus Corporation) can be used as such commercially available image analysis software.

The organic particles preferably have a volume-average particle diameter D50 of 0.1 μm or more, more preferably 0.2 μm or more, preferably 1 μm or less, and more preferably 0.8 μm or less. By setting the volume-average particle diameter D50 of the organic particles to be at least the lower limit value of the range described above, it is possible to suppress rises in the internal resistance of the functional layer and thus to further improve low-temperature output characteristics of a secondary battery. By setting the volume-average particle diameter D50 of the organic particles to be no greater than the upper limit value of the range described above, it is possible to increase adhesion of the organic particles in electrolysis solution and thus to further improve high-temperature cycle characteristics.

The volume-average particle diameter D50 of the organic particles may be measured as a particle diameter where the cumulative volume from the fine side amounts to 50% of the entire volume in a particle size distribution measured by a laser diffraction particle size analyzer where a water dispersion of the organic particles adjusted to have a solid content concentration of 15% by mass was used.

The organic particles may each have optional component(s) other than the core and shell as long as such component(s) do not significantly compromise expected effects. Specifically, for example, the organic particle may have inside the core a portion made of different polymer than the core. By way of specific example, seed particles which were used when producing the organic particles by seed polymerization may remain inside the core. However, from the perspective that the organic particles can exert significant levels of expected effects, the organic particles preferably have only a core and a shell.

—Core—

The core of the organic particle is made of polymer having a specific degree of swelling in electrolysis solution. Specifically, the core polymer needs to have a degree of swelling in electrolysis solution of 5 times or more, preferably 6 times or more, and more preferably 7 times or more, and needs to have a degree of swelling in electrolysis solution of 30 times or less, preferably 25 times or less, more preferably 20 times or less, and still more preferably 15 times or less. By setting the degree of swelling in electrolysis solution of the core polymer to be at least the lower limit value of the range described above, it is possible to increase ion diffusivity of the functional layer and thus to improve electrical characteristics of a secondary battery such as low-temperature output characteristics. By setting the degree of swelling in electrolysis solution of the core polymer to be no greater than the upper limit value of the range described above, it is possible to increase adhesion of the organic particles in electrolysis solution and thus to improve high-temperature cycle characteristics of a secondary battery. In this case, it is also possible to sufficiently suppress elution of the core into electrolysis solution. Further, in this case, inhibition of ion conduction due to conversion of the functional layer into membrane is suppressed, making it possible to ensure low-temperature output characteristics of a secondary battery.

The electrolysis solution used for the measurement of the degree of swelling in electrolysis solution of the core polymer can be a solution which is obtained by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

The degree of swelling in electrolysis solution of the core polymer can be measured in a manner as specifically described below.

First, a polymer for the core of the organic particles is prepared. For example, a polymer is prepared which was obtained by a process similar to that used for the core formation in the preparation of the organic particles. A film is fabricated using the polymer thus prepared. For example, when the polymer is solid, it is dried at 25° C. for 48 hours and then shaped into a 0.5 mm thick film. Alternatively, when the polymer is solution or dispersion liquid such as latex, the solution or dispersion liquid is placed into a polytetrafluoroethylene petri dish and dried at 25° C. for 48 hours to prepare a 0.5 mm thick film.

Next, the film prepared as described above is cut into a 1 cm×1 cm square sheet to provide a test specimen. The weight (W0) of the test specimen is measured. Further, the test specimen is immersed into the electrolysis solution described above at 60° C. for 72 hours and taken out from the electrolysis solution. The electrolysis solution on the surface of the test specimen is wiped off, and the weight (W1) of the test specimen after immersion is measured.

Using weights W0 and W1, the degree of swelling S (fold) is calculated using the equation S=W1/W0.

An exemplary method of adjusting the degree of swelling in electrolysis solution of the core polymer is to properly select the type and amount of a monomer used for the production of the core polymer in consideration of the SP value of the electrolysis solution. In general, when a polymer has an SP value close to that of electrolysis solution, the polymer tends to swell in the electrolysis solution. On the other hand, when a polymer has an SP value far from that of electrolysis solution, the polymer tends to be less likely to swell in the electrolysis solution.

The SP value as used herein means a solubility parameter.

The SP value can be calculated using the method introduced in "Hansen Solubility Parameters A User's Handbook, 2nd Ed (CRCPress)".

Further, an SP value of an organic compound can be estimated based on the molecular structure of the organic compound. Specifically, SP values may be calculated using simulation software capable of calculation of SP values using the SMILE equation (e.g., "HSPiP" (http=//www.hansen-solubility.com)). In this simulation software, SP values are calculated based on the theory described in "Hansen SOLUBILITY PARAMETERS A User's Handbook Second Edition, Charles M. Hansen."

The monomer used for the preparation of the core polymer may be appropriately selected from those that provide polymers whose degree of swelling in electrolysis solution falls within the range described above. Examples of such monomers include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; acid group-containing monomers such as carboxyl group-containing monomers, sulfonate group-containing monomers, phosphate group-containing monomers, and hydroxyl group-containing monomers; (meth)acrylic acid derivatives such as 2-hydroxyethyl methacrylate; (meth)acrylic acid ester monomers such as methyl acrylate, ethyl acrylate, methy methacrylate, ethyl methacrylate, and 2-ethylhexylacrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene-based monomers such as 1,3-butadiene and isoprene. These monomers may be used alone or in combination at any ratio.

As used herein, the term "(meth)acryl" refers to acryl and/or methacryl, and the term "(meth)acrylo" refers to acrylo and/or methacrylo.

Of these monomers, preferred for the preparation of the core polymer are (meth)acrylic acid ester monomers and (meth)acrylonitrile monomers, with (meth)acrylic acid ester monomers being more preferred. Specifically, the core polymer preferably contains a (meth)acrylic acid ester monomer unit or a (meth)acrylonitrile monomer unit, more preferably contains a (meth)acrylic acid ester monomer unit, and particularly preferably contains a monomer unit derived from methyl methacrylate. This not only makes it easy to control the degree of swelling of polymer, but can further increase ion diffusivity of the functional layer containing the organic particles.

The phrase "containing . . . monomer unit" as used herein means that "a polymer obtained with a monomer contains a structural unit derived from the monomer".

The percentage of the (meth)acrylic acid ester monomer in the core polymer is preferably 50% by mass or more, more preferably 60% by mass or more, still more preferably 80% by mass or more, preferably 98% by mass or less, more preferably 97% by mass or less, and still more preferably 95% by mass or less. By setting the percentage of the (meth)acrylic acid ester monomer unit to be at least the lower limit value of the range described above, it is possible to increase ion diffusivity of the functional layer and thus to further improve low-temperature output characteristics of a secondary battery. By setting the percentage of the (meth)acrylic acid ester monomer unit to be no greater than the upper limit value of the range described above, it is possible to increase adhesion of the organic particles in electrolysis solution and thus to further improve high-temperature cycle characteristics of a secondary battery.

The core polymer may contain an acid group-containing monomer unit. Examples of acid group-containing monomers include monomers having an acid group, such as carboxyl group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid. Examples of the dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, styrene sulfonic acid, (meth)acrylic acid-2-ethyl sulfonate, 2-acrylamide-2-methyl propane sulfonic acid, and 3-allyloxy-2-hydroxypropane sulfonic acid. The term "(meth)allyl" as used herein means allyl and/or methallyl.

Examples of the phosphate group-containing monomers include 2-(meth)acryloyloxyethyl phosphate, methyl-2-

(meth)acryloyloxyethyl phosphate, and ethyl-(meth)acryloyloxyethyl phosphate. The term "(meth)acryloyl" as used herein refers to "acryloyl and/or methacryloyl".

Examples of the hydroxyl group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxylic acid group-containing monomers are preferable, with monocarboxylic acids being more preferable, and (meth)acrylic acid being still more preferable.

These acid group-containing monomers may be used alone or in combination at any ratio.

The percentage of the acid group-containing monomer unit in the core polymer is preferably 0.1% by mass or more, more preferably 1% by mass or more, still more preferably 3% by mass or more, preferably 20% by mass or less, more preferably 10% by mass or less, and still more preferably 7% by mass or less. By setting the percentage of the acid group-containing monomer unit to fall within the range described above, it is possible to increase dispersibility of the core polymer during preparation of organic particles, enabling a shell that partially covers the core outer surface to be easily formed on the core outer surface.

The core polymer preferably contains a cross-linkable monomer unit in addition to the monomer units described above. A cross-linkable monomer refers to a monomer that may form a cross-linked structure during or after polymerization by heating or by irradiation with energy beams. When the core polymer contains a cross-linkable monomer unit, the degree of swelling of the polymer can be easily set to fall within the range described above.

Examples of the cross-linkable monomers include multifunctional monomers having two or more polymerizable groups in the monomers. Examples of such multi-functional monomers include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate. Of these monomers, from the perspective of easy control of the degree of swelling in electrolysis solution of the core polymer, ethylene glycol dimethacrylate, allyl glycidyl ether and glycidyl methacrylate are preferable, with ethylene glycol dimethacrylate being more preferable. These cross-linkable monomers may be used alone or in combination at any ratio.

In general, the degree of swelling in electrolysis solution of a polymer tends to decrease with increasing percentage of a cross-linkable monomer unit in that polymer. Accordingly, it is preferable to determine the percentage of a cross-linkable monomer unit in consideration of the type and amount of monomers used. The specific percentage of the cross-linkable monomer unit in the core polymer is preferably 0.1% by mass or more, more preferably 0.2% by mass or more, still more preferably 0.5% by mass or more, preferably 7% by mass or less, more preferably 6% by mass or less, and still more preferably 4.5% by mass or less. By setting the percentage of the cross-linkable monomer unit in the core polymer to be at least the lower limit value of the range described above, it is possible to increase adhesion of the organic particles in electrolysis solution and thus to further improve high-temperature cycle characteristics of a secondary battery. By setting the percentage of the cross-linkable monomer unit in the core polymer to be no greater than the upper limit value of the range described above, it is possible to ensure polymerization stability upon preparation of organic particles allowing the resultant organic particles to have a suitable particulate form.

The core polymer preferably has a glass-transition temperature of 0° C. or higher, more preferably 30° C. or higher, still more preferably 60° C. or higher, preferably 150° C. or below, more preferably 130° C. or below, and still more preferably 110° C. or below. By setting the glass-transition temperature of the core polymer to be at least the lower limit value of the range described above, it is possible to further improve low-temperature output characteristics of a secondary battery. By setting the glass-transition temperature of the core polymer to be no greater than the upper limit value of the range described above, it is possible to increase adhesion of the organic particles in electrolysis solution and thus to further improve high-temperature cycle characteristics of a secondary battery.

The core diameter is preferably 50% or more, more preferably 60% or more, still more preferably 70% or more, particularly preferably 80% or more, preferably 99% or less, more preferably 98.5% or less, and still more preferably 98% or less, with respect to the volume-average particle diameter of the organic particles (100%). By setting the core diameter to be at least the lower limit value of the above-specified range, it is possible to increase ion diffusivity of the functional layer. By setting the core diameter to be no greater than the upper limit value of the above-specified range, it is possible to increase adhesion of the organic particles.

The core diameter can be measured as a volume-average particle diameter D50 of the particulate polymer prior to shell formation, which is obtained in the production process of the organic particles. Such a particulate polymer prior to shell formation corresponds to a particulate core polymer. The volume-average particle diameter D50 of the particulate polymer prior to shell formation may be measured as with the volume-average particle diameter D50 of the organic particles.

—Shell—

The shell of the organic particle is made of polymer having a specific a degree of swelling in electrolysis solution which is smaller than that of the core. Specifically, the shell polymer needs to have a degree of swelling in electrolysis solution of greater than 1 time to 4 times, preferably 1.1 times or more, more preferably 1.2 times or more, preferably 3.5 times or less, more preferably 3 times or less, and still more preferably 2.5 times or less. By setting the degree of swelling in electrolysis solution of the shell polymer to be at least the lower limit value of the range described above, it is possible to increase ion diffusivity of the functional layer and thus to improve low-temperature output characteristics of a secondary battery. In this case, it is also possible to increase adhesion of the organic particles in electrolysis solution and thus to improve high-temperature cycle characteristics of a secondary battery. By setting the degree of swelling in electrolysis solution of the shell polymer to be no greater than the upper limit value of the range described above, it is possible to increase adhesion of the organic particles in electrolysis solution and thus to improve high-temperature characteristics of a secondary battery. Further, in this case, inhibition of ion conduction due to conversion of the functional layer into membrane is suppressed, making it possible to ensure low-temperature output characteristics of a secondary battery.

The electrolysis solution used for the measurement of the degree of swelling in electrolysis solution of the shell polymer is the same as that used for the measurement of the degree of swelling in electrolysis solution of the core polymer.

The degree of swelling in electrolysis solution of the shell polymer can be measured in a manner as specifically described below.

First, a polymer for the shell of the organic particles is prepared. For example, a polymer is produced as in the production method of core by using, instead of a monomer composition for core, a monomer composition for shell in the preparation of the organic particles.

Thereafter, using the same method as that used for the measurement of the degree of swelling of the core, a film is prepared from the polymer of the shell, a test specimen is cut from the film, and the test specimen is measured for degree of swelling (S).

An exemplary method of adjusting the degree of swelling in electrolysis solution of the shell polymer is to properly select the type and amount of a monomer used for the production of the shell polymer in consideration of the SP value of the electrolysis solution.

The monomer used for the preparation of the shell polymer may be appropriately selected from those that provide polymers whose degree of swelling in electrolysis solution falls within the range described above. Examples of such monomers include monomers similar to those exemplified above as monomers which may be used for the production of the core polymer. Such monomers may be used alone or in combination at any ratio.

Of these monomers, aromatic vinyl monomers are preferable as monomers used for the preparation of the shell polymer. Specifically, the shell polymer preferably contains an aromatic vinyl monomer unit. Among aromatic vinyl monomers, styrene and styrene derivatives such as styrene sulfonic acid are preferable. Aromatic vinyl monomers not only make it easy to control the degree of swelling in electrolysis solution of the polymer, but can further increase adhesion of the organic particles.

The percentage of the aromatic vinyl monomer unit in the shell polymer is preferably 50% by mass or more, more preferably 70% by mass or more, still more preferably 85% by mass or more, preferably 100% by mass or less, more preferably 99.9% by mass or less, and still more preferably 99.5% by mass or less. By setting the percentage of the aromatic vinyl monomer unit to be at least the lower limit value of the range described above, it is possible to increase adhesion of the functional layer in electrolysis solution and thus to further improve high-temperature cycle characteristics of a secondary battery. By setting the percentage of the aromatic vinyl monomer unit to be no greater than the upper limit value of the range described above, it is possible to increase ion diffusivity of the functional layer and thus to improve low-temperature output characteristics of a secondary battery.

The shell polymer may contain an acid group-containing monomer unit, other than the aromatic vinyl monomer unit. Examples of acid group-containing monomers include monomers having an acid group, such as carboxyl group-containing monomers, sulfonate group-containing monomers, phosphate group-containing monomers, and hydroxyl group-containing monomers. Specifically, examples of acid group-containing monomers include monomers similar to those that may constitute the acid group-containing monomer units which may be contained in the core.

Of these acid group-containing monomers, carboxylic acid group-containing monomers are preferable, with monocarboxylic acids being more preferable, and (meth)acrylic acid being still more preferable.

These acid group-containing monomers may be used alone or in combination at any ratio.

The percentage of the acid group-containing monomer unit in the shell polymer is preferably 0.1% by mass or more, more preferably 1% by mass or more, still more preferably 3% by mass or more, preferably 20% by mass or less, more preferably 10% by mass or less, and still more preferably 7% by mass or less. By setting the percentage of the acid group-containing monomer unit to fall within the range described above, it is possible to improve dispersibility of the organic particles in the functional layer allowing good adhesion to be exerted over the entire surface of the functional layer, particularly in electrolysis solution.

The shell polymer may contain a cross-linkable monomer unit. Examples of cross-linkable monomers include monomers similar to those exemplified above as cross-linkable monomers which may be used for the production of the core polymer. These cross-linkable monomers may be used alone or in combination at any ratio.

The percentage of the cross-linkable monomer unit in the shell polymer is preferably 0.1% by mass or more, more preferably 0.2% by mass or more, still more preferably 0.5% by mass or more, preferably 5% by mass or less, more preferably 4% by mass or less, and still more preferably 3% by mass or less.

The shell polymer preferably has a glass-transition temperature of 50° C. or higher, more preferably 60° C. or higher, still more preferably 70° C. or higher, preferably 200° C. or below, more preferably 180° C. or below, and still more preferably 150° C. or below. By setting the glass-transition temperature of the shell to be at least the lower limit value of the range described above, it is possible to prevent blocking of the functional layer as well as to further improve low-temperature output characteristics of a secondary battery. By setting the glass-transition temperature of the shell polymer to be no greater than the upper limit value of the range described above, it is possible to increase adhesion of the organic particles in electrolysis solution and thus to further improve high-temperature cycle characteristics of a secondary battery.

The shell preferably has an average thickness that falls within a specific range in percentage relative to the volume-average particle diameter D50 of the organic particles. Specifically, the average shell thickness in percentage relative to the volume-average particle diameter D50 of the organic particles (core-shell ratio) is preferably 1.5% or more, more preferably 2% or more, preferably 40% or less, more preferably 30% or less, and still more preferably 20% or less. By setting the average shell thickness to be at least the lower limit value of the range described above, it is possible to increase adhesion of the organic particles in electrolysis solution and thus to further improve high-temperature cycle characteristics of a secondary battery. By setting the average shell thickness to be no greater than the upper limit value of the range described above, it is possible to further improve low-temperature output characteristics of a secondary battery.

The average shell thickness can be obtained by the observation of cross-sectional structures of organic particles by transmission electron microscopy (TEM). Specifically, the maximum shell thickness in a cross-sectional structure of an organic particle is measured by TEM. 20 or more randomly-selected organic particles are measured for their maximum shell thickness, and an average of the measured maximum thicknesses is recorded as an average shell thickness. However, in the case that the shell is composed of polymer particles and these polymer particles are arranged in a monolayer without being stacked on top of one another in the radial direction of the organic particle, the number-average particle diameter of the polymer particles is recorded as an average shell thickness.

Although the shell may take any form, it is preferably composed of polymer particles. When the shell is composed of polymer particles, these shell particles may be stacked on top of one another in the radial direction of the organic particle. However, shell particles are preferably arranged in a monolayer to constitute a shell without being stacked on top of one another in the radial direction of the organic particle.

When the shell is composed of polymer particles, these shell particles preferably have a number-average particle diameter of 10 nm or more, more preferably 20 nm or more, still more preferably 30 nm or more, preferably 200 nm or less, more preferably 150 nm or less, and still more preferably 100 nm or less. By setting the number-average particle diameter to fall within the above-specified range, it is possible to establish a good balance between ion diffusivity and adhesion.

The number-average particle diameter of shell particles can be obtained by the observation of cross-sectional structures of organic particles by transmission electron microscopy (TEM). Specifically, the maximum diameter of shell particles in a cross-sectional structure of an organic particle is measured, and an average of the maximum shell diameters for 20 or more organic particles is recorded as a number-average particle diameter of shell particles.

[Preparation Method of Organic Particles]

Organic particles having the core-shell structure described above can be prepared for example by stepwise polymerization of monomers for core and shell polymers with the ratios of these monomers being changed over time. Specifically, the organic particles can be prepared by continuous, multi-stage emulsion polymerization or multi-stage suspension polymerization wherein, e.g., a polymer produced in a previous stage is sequentially covered with a polymer produced in a later stage.

By way of example, the following describes an exemplary case where organic particles having the core-shell structure described above are obtained by multi-stage emulsion polymerization.

For polymerization, as emulsifiers, anionic surfactants such as sodium dodecylbenzene sulfonate and sodium dodecyl sulfonate; nonionic surfactants such as polyoxyethylene nonylphenyl ether and sorbitan monolaurate; or cationic surfactants such as octadecylamine acetate can be used in accordance with a common procedure. As polymerization initiators, peroxides such as t-butyl peroxy-2-ethylhexanoate, potassium persulfate and cumene peroxide; or azo compounds such as 2,2'-azobis(2-methyl-N-(2-hydroxyethyl)-propionamide), and 2,2'-azobis(2-amidinopropane) hydrochloride can be used.

The polymerization procedure is as follows: A monomer for core and an emulsifier are first mixed, and batch emulsion polymerization of the monomer is effected to yield a particulate core polymer. Polymerization of a monomer for shell is then effected in the presence of this particulate core polymer to afford in organic particles having the core-shell structure described above.

At this time, from the perspective of achieving partial shell coverage on the core outer surface, the monomer for shell polymer is preferably supplied to the polymerization system either multiple times in divided portions or continuously. By supplying the monomer for shell polymer to the polymerization system either multiple times in divided portions or continuously, a shell polymer is produced in particulate form and this particle binds to a core. In this way, a shell that partially covers a core can be formed.

When the monomer for shell polymer is supplied multiple times in divided portions, it is possible to control the particle diameters of particles of the shell and the average shell thickness according to the number of divided portions. When the monomer for shell polymer is supplied continuously, it is possible to control the particle diameters of shell particles and the average shell thickness by adjusting the amount of the monomer supplied per unit time.

When a monomer that has a low affinity for polymerization solvent is used as the monomer for the shell polymer, a shell that partially covers a core tends to be easily formed. Thus, when water is used as a polymerization solvent, the monomers for the shell polymer preferably include a hydrophobic monomer, particularly preferably an aromatic vinyl monomer.

Further, when smaller amounts of emulsifier are used for the polymerization of the monomer for shell, a shell that partially covers a core tends to be easily formed. Thus, a shell that partially covers a core can be formed also by appropriately adjusting the amount of emulsifier.

The volume-average particle diameter D50 of the particulate core polymer, volume-average particle diameter D50 of organic particles after shell formation, and number-average particle diameter of shell particles can be set to fall within their desired ranges for example by the adjustment of the amounts of emulsifier and monomer, for example.

Further, the average ratio of shell coverage on the core outer surface can be set to fall within a desired range for example by the adjustment of the amount of emulsifier and the amount of the monomer for the shell polymer correspondingly with the volume-average particle diameter D50 of the particulate core polymer.

«Binder»

As described above, the organic particles do not normally exert adhesion when not swollen in electrolysis solution. Thus, it is required to use a binder from the perspective of preventing components contained in the functional layer from coming off the functional layer prior to immersion into electrolysis solution and of suitably forming the functional layer on a releasable substrate and suitably transferring the functional layer onto a substrate for secondary battery. "Binder" does not encompass the organic particles described above. As a binder, it is preferable to add to the functional layer a particulate polymer for functional layer, which may exert higher adhesion than the organic particles in a 25° C. environment where the particulate polymer is not swollen in electrolysis solution. The use of a binder such as a particulate polymer for functional layer can prevent the components of the functional layer from coming off the functional layer both when the organic particles are swollen in electrolysis solution and when they are not swollen in electrolysis solution. In addition, in this case, it is possible to ensure that the functional layer in dry state exhibits adhesion to both the releasable substrate and substrate for secondary battery, ensuring manufacture of a laminate for secondary battery as well as allowing for easy manufacture of a secondary battery member having a functional layer by using the laminate for secondary battery.

Examples of particulate polymers for functional layer which may be used in combination with the organic particles include water-insoluble, water-dispersible particulate polymers known in the art; specific examples thereof include thermoplastic elastomers. Of thermoplastic elastomers, preferred are conjugated diene-based polymers and acrylic polymers, with acrylic polymers being more preferred.

The term "conjugated diene-based polymer" refers to a polymer containing a conjugated diene monomer unit. Specific examples of conjugated diene-based polymers include polymers containing an aromatic vinyl monomer unit and an aliphatic conjugated diene monomer unit, such as styrene-butadiene copolymer (SBR). The term "acrylic polymer" refers to a polymer containing a (meth)acrylic acid ester monomer unit.

These particulate polymers for functional layer may be used alone or in combination. It should be noted that when two or more different particulate polymers for functional layer are used in combination, these polymers are different from organic particles having a core-shell structure which is made of polymers having the specific degrees of swelling in electrolysis solution described above.

Acrylic polymers as particulate polymers for functional layer further preferably contain a (meth)acrylonitrile monomer unit. This makes it possible to increase strength of the functional layer.

In an acrylic polymer as a particulate polymer for functional layer, the percentage of the amount of the (meth)acrylonitrile monomer unit relative to the total amount of the (meth)acrylonitrile monomer unit and (meth)acrylic acid ester monomer unit is preferably 1% by mass or more, more preferably 2% by mass or more, preferably 30% by mass or less, and more preferably 25% by mass or less. By setting the percentage of the amount of the (meth)acrylonitrile monomer unit to be at least the lower limit value of the range described above, it is possible to increase strength of the acrylic polymer as a particulate polymer for functional layer, and thus to enhance strength of the functional layer containing the acrylic polymer. By setting the percentage of the amount of the (meth)acrylonitrile monomer unit to be no greater than the upper limit value of the range described above, the acrylic polymer as a particulate polymer for functional layer moderately swells in electrolysis solution, so that it is possible to suppress reductions in ion conductivity of the functional layer and reductions in low-temperature output characteristics of a secondary battery.

The particulate polymer for functional layer as a binder preferably has a glass-transition temperature of −50° C. or higher, more preferably −40° C. or higher, preferably 25° C. or below, more preferably 0° C. or below, and still more preferably −5° C. or below. By setting the glass-transition temperature of the particulate polymer for functional layer as a binder to be at least the lower limit value of the range described above, it is possible to further improve low-temperature output characteristics of a secondary battery. By setting the glass-transition temperature of the particulate polymer for functional layer as a binder to be no greater than the upper limit value of the range described above, it is possible to enhance transferability of a functional layer when forming the functional layer on a substrate for secondary battery using the laminate for secondary battery.

The particulate polymer for functional layer preferably has a volume-average particle diameter D50 of 0.1 μm to 0.5 μm. By setting the volume-average particle diameter D50 of the particulate polymer for functional layer to be at least the lower limit value of the range described above, it is possible to increase dispersibility of the particulate polymer for functional layer. By setting the volume-average particle diameter D50 to be no greater than the upper limit value of the range described above, it is possible to increase adhesion of the particulate polymer for functional layer and thus to enhance transferability of the functional layer. The volume-average particle diameter D50 of the particulate polymer for functional layer may be measured as with the volume-average particle diameter D50 of the organic particles.

The amount of the particulate polymer for functional layer as a binder blended in the functional layer is preferably 5 parts by mass or more, more preferably 10 parts by mass or more, preferably 40 parts by mass or less, and more preferably 30 parts by mass or less per 100 parts by mass of the organic particles. By setting the amount of the particulate polymer for functional layer as a binder to be at least the lower limit value of the range described above, it is possible to ensure that the functional layer in dry state exhibits adhesion to a releasable substrate as well as to a substrate for secondary battery, ensuring transferability of the functional layer. Further, in this case, it is possible to increase adhesion of the functional layer in electrolysis solution. On the other hand, by setting the amount of the particulate polymer for functional layer as a binder to be no greater than the upper limit value of the range described above, peeling of the functional layer from the releasable substrate is facilitated allowing transferability of the functional layer to be enhanced. Further, in this case, it is possible to suppress reductions in ion diffusivity of the functional layer and thus to ensure low-temperature output characteristics of a secondary battery.

Examples of methods of producing the particulate polymer for functional layer include solution polymerization, suspension polymerization, and emulsion polymerization. Of these polymerization methods, preferred are emulsion polymerization and suspension polymerization because polymerization can be effected in water and therefore a water dispersion containing a particulate polymer can be suitably directly used as a material for the functional layer composition. Upon production of a polymer as a particulate polymer for functional layer, the reaction system preferably contains a dispersant. In general, the particulate polymer for functional layer is substantially formed of a polymer that constitutes that particulate polymer. However, the particulate polymer may also have optional component(s) such as additives which were used for polymerization.

«Non-Conductive Particles»

Any type of non-conductive particles can be blended into the functional layer that may function as a porous membrane layer. Examples thereof include non-conductive particles known in the art used for non-aqueous secondary batteries.

Specifically, both inorganic and organic microparticles other than the organic particles and the particulate polymers for functional layer (binder) described above can be used as non-conductive particles. However, inorganic microparticles are normally used. Among materials of non-conductive particles, such materials are preferred that are present stably in the use environment of non-aqueous secondary batteries and have electrochemical stability. Preferred examples of materials of non-conductive particles from such a perspective include particles of oxides such as aluminum oxide (alumina), hydrated aluminum oxide (boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite. These particles may be subjected to element replacement, surface treatment, solid solution treatment and/or the like where necessary.

The non-conductive particles may be used alone or in combination. The amount of non-conductive particles blended in the functional layer may be adjusted as appropriate.

«Additional Components»

The functional layer may contain optional additional component(s) in addition to the components described above. Examples of additional components include additives known in the art, such as wetting agents, viscosity modifiers, and additives for electrolysis solution. These additional components may be used alone or in combination.

As will be described later, a functional layer is normally formed by applying a functional layer composition onto a releasable substrate and drying the composition. It is thus preferable to use wetting agents from the perspective of for example reducing uneven application of the functional layer composition on the releasable substrate.

The amount of the wetting agent blended in the functional layer (and functional layer composition) is preferably 0.1 parts by mass or more, more preferably 0.5 parts by mass or more, preferably 10 parts by mass or less, and more preferably 5 parts by mass or less per 100 parts by mass of the organic particles. By setting the amount of the wetting agent to be at least the lower limit value of the range described above, it is possible to reduce uneven application of the functional layer composition and thus to ensure that the resultant functional layer exhibits adhesion to a releasable substrate. By setting the amount of the wetting agent to be no greater than the upper limit value of the range described above, it is possible to enhance functional layer transferability when forming a functional layer on a substrate for secondary battery using the laminate for secondary battery, as well as to ensure that the functional layer exhibits adhesion in electrolysis solution.

<Releasable Substrate>

The releasable substrate that constitutes the laminate for secondary battery is a substrate on which the functional layer described above is to be adjacently disposed, and is also a substrate which may be easily peeled from the functional layer when transferring the functional layer onto a substrate for secondary battery. The releasable substrate may take any form (e.g., film form) and may be made of any material; any of the forms and materials known in the art can be employed.

The releasable substrate needs to have a water contact angle of 70° or more, preferably 80° or more, more preferably 90° or more, and still more preferably 98° or more. On the other hand, the water contact angle is preferably 130° or less, more preferably 120° or less, and still more preferably 105° or less. A water contact angle of less than 70° results in the functional layer formed from an aqueous functional layer composition exhibiting excessive adhesion to the releasable substrate, resulting in failure to ensure transferability of the functional layer. On the other hand, a water contact angle of no greater than 130° can reduce uneven application of the functional layer composition on the releasable substrate.

<Method of Manufacturing Laminate for Non-Aqueous Secondary Battery>

Any method that involves formation of a functional layer on a releasable substrate can be used for the manufacture of a laminate for secondary battery. In general, methods that involve drying functional layer compositions on the releasable substrate are employed.

The components to be contained in the functional layer composition may be selected in accordance with the components to be contained in the functional layer described above, and suitable ratios of these components in the functional layer composition are the same as those of the components in the functional layer.

«Non-Aqueous Secondary Battery Functional Layer Composition»

Any method can be employed for the preparation of a functional layer composition. A functional layer composition is normally prepared by mixing together organic particles, a binder, water (dispersion medium), and non-conductive particles and additional component(s) such as wetting agents which are used where necessary. Any method can be used for mixing. For efficient dispersing of the components, mixing is normally performed using a dispersing device as a mixing device.

The dispersing device is preferably capable of uniformly dispersing and mixing the components described above. Examples of the dispersing device include ball mill, sand mill, pigment disperser, grinding machine, ultrasonic disperser, homogenizer, and planetary mixer. For their ability to apply a high dispersing shear force, high-dispersing devices such as bead mill, roll mill, and FILMIX can also be exemplified.

The resultant functional layer composition may have any viscosity. The functional layer composition preferably has a viscosity of 1 mPa·s or more, more preferably 5 mPa·s or more, still more preferably 10 mPa·s or more, particularly preferably 15 mPa·s or more, preferably 100 mPa·s or less, and more preferably 90 mPa·s or less. When the viscosity of the functional layer composition falls within the range described above, it is possible to ensure applicability of the functional layer composition onto the releasable substrate while allowing the components such as organic particles to be well dispersed in the functional layer composition. "Viscosity" as used herein refers to a value measured using a B-type viscometer at 25° C. and at a rotational speed of 60 rpm.

The functional layer composition preferably has a surface tension of 20 mN/m or more, more preferably 25 mN/m or more, preferably 50 mN/m or less, and more preferably 40 mN/m or less. When the surface tension of the functional layer composition is at least the lower limit value of the range described above, it is possible to further improve adhesion in electrolysis solution of the resultant functional layer. On the other hand, when the surface tension of the functional layer composition is no greater than the upper limit value of the above range, it is possible to reduce uneven application of the functional layer composition upon application on the releasable substrate, and also transferability of the functional layer increases. The surface tension of the functional layer composition can be appropriately adjusted for example by changing the amounts of wetting agent and binder to be blended. The "surface tension" of the functional layer composition herein can be measured using the method described in the Examples of the specification.

«Method of Forming Functional Layer on Releasable Substrate»

Examples of methods of forming a functional layer on a releasable substrate using the functional layer composition described above include the following Methods 1) and 2):

1) method in which the functional layer composition is applied on the surface of a releasable substrate and dried; and 2) method in which a releasable substrate is immersed into the functional layer composition and dried.

Of the two methods, preferred is Method 1) because of easiness of controlling the thickness of the functional layer. More specifically, Method 1) includes applying the functional layer composition on a releasable substrate (application step), and forming a functional layer by drying the functional layer composition applied on the releasable substrate (functional layer forming step).

In the application step, any method can be used for applying the functional layer composition on the releasable substrate. Examples include spray coating, doctor blading, reverse roll coating, direct roll coating, gravure coating, extrusion coating, and brush coating. Of these methods, preferred are gravure coating and spray coating from the perspective of forming a thin functional layer.

In the functional layer forming step, the functional layer composition applied on the releasable substrate can be dried by any method known in the art, e.g., drying by warm, hot, or low-humidity air; vacuum drying; or drying by irradiation with infrared light or electron beams. Any drying condition can be used; drying temperature is preferably 30° C. to 80° C., and drying time is preferably 30 seconds to 10 minutes.

The thickness of the functional layer formed on the releasable substrate is preferably 0.01 μm or more, more preferably 0.1 μm or more, still more preferably 0.5 μm or more, preferably 20 μm or less, more preferably 10 μm or less, and still more preferably 5 μm or less. When the thickness of the functional layer is at least the lower limit value of the range described above, it is possible to sufficiently ensure strength of the functional layer. When the thickness of the functional layer is no greater than the upper limit value of the range described above, it is possible to ensure ion diffusivity of the functional layer and thus to further improve low-temperature output characteristics of a secondary battery.

The adhesion strength between the functional layer and releasable substrate is preferably 5 N/m or more, more preferably 10 N/m or more, preferably 50 N/m or less, and more preferably 40 N/m or less. When the adhesion strength between the functional layer and releasable substrate is at least the lower limit value of the range described above, the components in the functional layer do not easily come off from the releasable substrate, making it possible to ensure that the functional layer is retained on the releasable substrate. On the other hand, when the adhesion strength between the functional layer and releasable substrate is no greater than the upper limit value of the range described above, peeling of the functional layer from the releasable substrate is facilitated allowing transferability of the functional layer to be enhanced.

The "adhesion strength" between the functional layer and releasable substrate herein can be measured using the method described in the Examples of the specification.

On the other hand, from the perspective of ensuring high transferability of the functional layer to the substrate for secondary battery, it is preferred that the adhesion strength between the functional layer and releasable substrate be smaller than the adhesion strength between the functional layer and substrate for secondary battery.

The adhesion strength between the functional layer and substrate for secondary battery (electrode substrate or separator substrate) varies depending on the type and material of the substrate for secondary battery. However, the adhesion strength between the functional layer and substrate for secondary battery generally correlates with and approximates the adhesion strength between the functional layer and aluminum foil. Thus, the adhesion strength between the functional layer and releasable substrate is preferably smaller than the adhesion strength between the functional layer and aluminum foil. The adhesion strength between the functional layer and aluminum foil is preferably 100 N/m or more, more preferably 150 N/m or more, preferably 500 N/m or less, and more preferably 300 N/m or less. When the adhesion strength between the functional layer and aluminum foil is at least the lower limit value of the range described above, a sufficient adhesion is provided between the functional layer and substrate for secondary battery. On the other hand, when the adhesion strength between the functional layer and aluminum foil is no greater than the upper limit value of the range described above, increases in density of the functional layer during press-bonding for ensuring adhesion strength can be suppressed, so that ion diffusivity of the functional layer is ensured and thus low-temperature output characteristics of a secondary battery improve.

The "adhesion strength" between the functional layer and aluminum foil herein can be measured using the method described in the Examples of the specification.

(Method of Manufacturing Non-Aqueous Secondary Battery Member)

A non-aqueous secondary battery member (electrode, separator) having a functional layer can be manufactured by forming a functional layer on a substrate for non-aqueous secondary battery using the disclosed laminate for non-aqueous secondary battery obtained in the manner as described above. Specifically, the disclosed method of manufacturing a non-aqueous secondary battery member includes disposing a laminate for non-aqueous secondary battery such that a functional layer is adjacent to a substrate for non-aqueous secondary battery, and bonding the functional layer to the substrate for secondary battery (bonding step); and peeling the releasable substrate from the functional layer (peeling step).

Non-aqueous secondary battery members manufactured using the disclosed method of manufacturing a non-aqueous secondary battery member can allow secondary batteries to exert superior electrical characteristics (low-temperature output characteristics and high-temperature cycle characteristics).

<Bonding Step>

Any substrate can be used as a substrate for secondary battery to which a functional layer is bonded in the bonding step. When a separator is to be manufactured as a secondary battery member, it is possible to use a separator substrate as a substrate for secondary battery, and when an electrode is to be manufactured as a secondary battery member, it is possible to use, as a substrate for secondary battery, an electrode substrate that includes an electrode mixed material layer formed on a current collector.

When the functional layer mainly functions as an adhesive layer, the functional layer may be formed on a separator substrate or electrode substrate having a porous membrane layer formed on the surface.

[Separator Substrate]

Any separator substrate can be used; for example, those described in JP2012204303A can be used. Of these separator substrates, fine porous membranes made of polyolefinic (i.e., polyethylene, polypropylene, polybutene, or polyvinyl chloride) resin are preferable for their ability to reduce total separator thickness thus increasing the ratio of the electrode active material in the secondary battery and consequently increasing the capacity per volume.

[Electrode Substrate]

Any electrode substrate (positive electrode substrate and negative electrode substrate) can be used. Examples include electrode substrates that include an electrode mixed material layer formed on a current collector.

The current collector, electrode mixed material layer components (e.g., electrode active materials (i.e., positive and negative electrode active materials) and binders for electrode mixed material layer (i.e., binders for positive and negative electrode mixed material layers)) and method of forming an electrode mixed material layer on a current collector can be selected from those known in the art; for example, those described in JP2013145763A can be used.

[Bonding Method]

In the bonding step, any method can be used to bond together the functional layer (component of the laminate for secondary battery) and the substrate for secondary battery. Press bonding by means of a mold press or roll press is preferable. The press bonding condition (e.g., pressure, temperature, and time) may be appropriately changed according to the glass-transition temperature of the binder used, for example. Referring to press bonding using a roll press by way of example, the roll temperature, for example, can be appropriately set in a range of 50° C. to 200° C.

<Peeling Step>

In the peeling step, any method known in the art can be used to peel the releasable substrate from the functional layer to obtain a secondary battery member having a functional layer on a substrate for secondary battery.

(Non-Aqueous Secondary Battery)

Using a non-aqueous secondary battery member manufactured using the disclosed method of manufacturing a non-aqueous secondary battery member, it is possible to manufacture a non-aqueous secondary battery that exhibits superior electrical characteristics such as high-temperature cycle characteristics and low-temperature output characteristics.

<Positive Electrode, Negative Electrode and Separator>

In a secondary battery, at least one secondary battery member may be manufactured by the disclosed method of manufacturing a non-aqueous secondary battery member. Namely, at least one of the positive electrode, negative electrode and separator used in a secondary battery includes a functional layer. Specifically, positive and negative electrodes having a functional layer can be electrodes that include a functional layer provided on an electrode substrate having an electrode mixed material layer formed on a current collector. A separator having a functional layer can be a separator that includes a functional layer provided on a separator substrate, or a separator formed of a functional layer. Electrode substrates and separator electrodes similar to those described in the section titled "Method of Manufacturing Non-Aqueous Secondary Battery Member" can be used.

As a positive electrode, a negative electrode and a separator which do not have a functional layer, it is possible to use electrodes formed of the electrode substrate described above, and a separator formed of the separator substrate described above.

<Electrolysis Solution>

As the electrolysis solution, an organic electrolysis solution obtained by dissolving a supporting electrolyte into an organic solvent is normally used. For lithium ion secondary batteries, lithium salts are used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation. Electrolytes may be used alone or in combination at any ratio. Normally, lithium ion conductivity tends to increase as a supporting electrolyte with a higher degree of dissociation is used. Therefore, lithium ion conductivity can be adjusted by the type of supporting electrolyte.

Any organic solvent that can dissolve the supporting electrolyte can be used as the organic solvent in the electrolysis solution. For lithium ion secondary batteries, for example, preferred examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Of these solvents, carbonates are preferable for their high dielectric constant and broad stable potential region. Normally, lithium ion conductivity tends to increase with decreasing viscosity of the solvent used. Therefore, lithium ion conductivity can be adjusted by the type of solvent.

The electrolyte concentration of the electrolysis solution can be appropriately adjusted. Any of the additives known in the art may be added to the electrolysis solution.

<Method of Manufacturing Non-Aqueous Secondary Battery>

A non-aqueous secondary battery may be manufactured for example by stacking a positive electrode and a negative electrode with a separator provided therebetween, winding or folding the resulting laminate as necessary in accordance with the battery shape, placing it in a battery container, filling the battery container with an electrolysis solution, and sealing the container. Among secondary battery members, at least one of the positive electrode, negative electrode and separator is a secondary battery member manufactured using the disclosed method of manufacturing a non-aqueous secondary battery member. To prevent an internal pressure rise in the battery and the occurrence of overcharge/overdischarge, expanded metal; an overcurrent preventing device such as a fuse or a PTC device; a lead plate; and so forth may be placed in the battery where necessary. The battery may be of any shape, such as coin, button, sheet, cylindrical, square or flat shape.

EXAMPLES

Hereinafter, the disclosed products and methods will be specifically described with reference to Examples; however, the disclosure is not limited to the Examples. In the following, "%" and "parts" used in expressing quantities are by mass, unless otherwise specified.

In a polymer produced by copolymerization of more than one monomer, the percentage of a structural unit formed by polymerization of a monomer in the polymer is consistent with the proportion (blending ratio) of the monomer in the total monomers used for the polymerization of the polymer, unless otherwise indicated.

In Examples and Comparative Examples, the following properties were measured and evaluated by the methods described below: the degree of swelling in electrolysis solution of organic particle polymers; average ratio of shell coverage on the core outer surface (ratio of coverage); average shell thickness of organic particles (core-shell ratio); volume-average particle diameters D50 of particles (organic particles and particulate polymer for functional layer); glass-transition temperatures of polymers (core polymer, shell polymer, and particulate polymer for functional layer); surface tension of composition for non-aqueous secondary battery functional layer; adhesion strength between functional layer and releasable substrate; adhesion strength between functional layer and aluminum foil; adhesion in electrolysis solution of functional layer (adhesion strength between functional layer and electrode substrate after immersion into electrolysis solution); transferability of functional layer; water contact angle of releasable substrate; and low-temperature output characteristics and high-temperature cycle characteristics of secondary battery.

<Degree of Swelling in Electrolysis Solution of Organic Particle Polymers>

Using monomer compositions used for the preparation of the core and shell of the organic particles, water dispersions of polymers (for core and for shell) as measurement specimens were prepared using a polymerization condition similar to that used for the core and the shell.

Next, the water dispersions thus obtained were each placed in a polytetrafluoroethylene petri dish and dried at 25° C. for 48 hours to manufacture a 0.5 mm thick film. Each obtained film was cut into a 1 cm×1 cm square sheet to provide a test specimen. The weight (W0) of the test specimen was measured. The test specimen was immersed into electrolysis solution at 60° C. for 72 hours. The test specimen was then taken out from the electrolysis solution, the electrolysis solution on the surface of the test specimen was wiped off, and the weight (W1) of the test specimen after immersion was measured. Using the weights W0 and W1, the degree of swelling S (fold) was calculated based on the equation S=W1/W0.

The electrolysis solution was prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

<Average Ratio of Shell Coverage on Outer Core Surface of Organic Particle (Ratio of Coverage)>

Organic particles were fully dispersed in visible light-curable epoxy resin ("D-800" from JEOL Ltd.) and then embedded to form a block piece containing the organic particles. A thin slice of 100 nm thickness was then cut from the block piece using a microtome equipped with a diamond blade to prepare a measurement specimen. Thereafter, the measurement specimen was subjected to dying treatment using ruthenium tetroxide.

The dyed measurement specimen was then loaded into a transmission electron microscope ("JEM-3100F" from JEOL Ltd.), and an image of a cross-sectional structure of an organic particle was captured at an acceleration voltage of 80 kV. The magnification of the electron microscope was set such that a cross-section of one organic particle is within the field of view. In the cross-sectional structure of the captured organic particle, length D1 (circumferential length of the core) and length D2 (length of a part where the core outer surface contacts the shell) were measured, and the ratio of shell coverage on the core outer surface of that organic particle (Rc) was calculated using the following Equation (1):

$$\text{Ratio of coverage } Rc\ (\%) = (D2/D1) \times 100 \qquad (1)$$

The ratio of coverage (Rc) was measured for 20 randomly-selected organic particles, and an average was calculated. The calculated average was recorded as an average ratio of shell coverage on the core outer surface (ratio of coverage).

<Average Shell Thickness (Core-Shell Ratio) of Organic Particle>

The average shell thickness of organic particles was measured through the procedure described below.

When the shell is composed of polymer particles, a cross-sectional structure of an organic particle was observed by transmission electron microcopy as in the measurement of the ratio of coverage described above. From the cross-sectional structure of the organic particle observed, the maximum diameter of shell polymer particles was then measured. 20 randomly-selected organic particles were measured for their maximum diameter of shell polymer particles, and an average of the maximum diameters was recorded as an average shell thickness.

When the shell has a shape other than particulate shape, a cross-sectional structure of an organic particle was observed by transmission electron microcopy as in the measurement of the ratio of coverage described above. From the cross-sectional structure of the organic particle observed, the maximum shell thickness was measured. 20 randomly-selected organic particles were measured for their maximum shell thickness, and an average of the maximum shell thicknesses was recorded as an average shell thickness.

The core-shell ratio (unit: %), which represents the ratio of average shell thickness to volume-average particle diameter D50 of organic particles, was then calculated by dividing the measured average shell thickness by the volume-average particle diameter D50 of the organic particles for evaluation of average shell thickness.

<Volume-Average Particle Diameter D50 of Particles>

The volume-average particle diameters D50 of particles (organic particles and particulate polymer for functional layer) were each recorded as a particle diameter where the cumulative volume from the fine side amounts to 50% of the entire volume in a particle size distribution measured by a laser diffraction particle size analyzer ("SALD-3100" from Shimadzu Corporation) where water dispersions of the particles adjusted to have a solid content concentration of 15% by mass were used.

<Glass-Transition Temperatures (Tg) of Polymers>

For the measurement of the glass-transition temperatures of core polymer and shell polymer, monomer compositions used for the preparation of these polymers were used to prepare water dispersions of polymers as measurement specimens using polymerization conditions similar to those used for these polymers, and measurement specimens obtained by drying the water dispersions to solid mass were used.

For the measurement of the glass-transition temperature of the particulate polymer for functional layer, a test specimen obtained by drying a water dispersion of the resultant particulate polymer for functional layer to solid mass was used.

Next, a DSC curve was measured on a differential scanning calorimeter ("EXSTAR DSC6220" from SIT Nano-Technology Inc.) at normal temperature and normal humidity in the measurement temperature range of −100° C. to 500° C. at a heating rate of 10° C./min, where 10 mg of measurement specimen was weighed into an aluminum pan, and an empty aluminum pan was used as a reference. The glass-transition temperature was determined from the point of intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak, in this heating step.

<Surface Tension of Composition for Non-Aqueous Secondary Battery Functional Layer>

The surface tension of a functional layer composition was measured by the platinum plate method using an automatic surface tensiometer ("DY-300" from Kyowa Interface Science Co., Ltd.).

<Adhesion Strength between Functional Layer and Releasable Substrate>

A laminate for secondary battery having a releasable substrate and a functional layer was cut into a 100 mm×10 mm rectangular piece to prepare a test specimen. The surface of the functional layer of the test specimen was attached to an adhesive cellophane tape (specified in JIS Z1522) with the functional layer facing down, and the stress at the time when the releasable substrate was peeled by pulling up one end in the vertical direction at a pulling rate of 50 mm/min was measured (note that the adhesive cellophane tape had been affixed on the horizontal test stage beforehand). The measurement was made 3 times. An average of the measured stress values was recorded as peel strength P1. A greater peel strength P1 indicates greater adhesion between the functional layer and releasable substrate.

<Adhesion Strength between Functional Layer and Aluminum Foil>

A laminate for secondary battery having a releasable substrate and a functional layer was disposed on aluminum foil ("1N99" from Nippon Foil Mfg. Co., Ltd.) such that the functional layer contacts the aluminum foil. The laminate for secondary battery and aluminum foil were bonded together by being passed through a roll press at 100° C. at a rate of 20 m/min under a linear pressure of 200 Kgf/cm. The releasable substrate was then separated from the functional layer using a roll. In this way the functional layer was transferred to the aluminum foil. The resultant laminate of functional layer and aluminum foil was cut into a 100 mm×10 mm rectangular piece to prepare a test specimen. The surface of the functional layer of the test specimen was attached to an adhesive cellophane tape (specified in JIS Z1522) with the functional layer facing down, and the stress at the time when the aluminum foil was peeled by pulling up one end in the vertical direction at a pulling rate of 50 mm/min was measured (note that the adhesive cellophane tape had been affixed on the horizontal test stage beforehand). The measurement was made 3 times. An average of the measured stress values was recorded as peel strength P2. A greater peel strength P2 indicates greater adhesion between the functional layer and aluminum foil, i.e., greater adhesion strength between the functional layer and substrate for secondary battery.

<Adhesion in Electrolysis Solution of Functional Layer (Adhesion Strength between Functional Layer and Electrode Substrate after Immersion into Electrolysis Solution)>

An electrode having a functional layer on an electrode substrate was cut into a 100 mm×10 mm rectangular piece to prepare a test specimen. The test specimen was immersed into electrolysis solution (solvent: EC/DEC/VC (mixing ratio: 68.5/30/1.5 (by volume)); electrolyte: 1 mol/L LiPF$_6$) at 60° C. for 3 days. The test specimen was then taken out from the electrolysis solution, and the electrolysis solution on the surface of the test specimen was wiped off. The surface of the functional layer was attached to an adhesive cellophane tape (specified in JIS Z1522) with the surface of the functional layer from which the electrolysis solution had been wiped off facing down, and the stress at the time when the current collector of the electrode substrate was peeled by pulling up one end in the vertical direction at a pulling rate of 50 mm/min was measured (note that the adhesive cellophane tape had been affixed on the horizontal test stage beforehand). The measurement was made 3 times. An average of the measured stress values was recorded as peel strength P3, and evaluated based on the criteria given below. A greater peel strength P3 indicates superior adhesion in electrolysis solution of the functional layer.

A: peel strength P3 is 10 N/m or greater
B: peel strength P3 is 5 N/m or greater to less than 10 N/m
C: peel strength P3 is less than 5 N/m <Transferability of Functional Layer>

A laminate for secondary battery having a releasable substrate and a functional layer was cut into a 100 mm×10 mm rectangular piece to prepare a test specimen (note that mass M0 of a 100 mm×10 mm rectangular releasable substrate alone was separately measured). The test specimen and an electrode substrate were disposed such that the functional layer side of the test specimen faces the electrode mixed material layer side of the electrode substrate, and pressed for 1 minute at 100 C.° under a linear pressure of 200 Kgf/cm. From the resultant laminate that includes, in order, the releasable substrate, functional layer and electrode substrate, the releasable substrate was peeled by pulling up one end in the vertical direction at a pulling rate of 50 mm/min. In this way transfer of the functional layer was completed. Mass M1 of the releasable substrate after transfer was measured. The quotient of mass M0 of the releasable substrate alone divided by mass M1 of the releasable substrate after transfer and multiplied by 100 (M0/M1 ratio, unit: % by mass) was calculated to evaluate transferability based on the criteria given below. A greater value of the M0/M1 ratio indicates a smaller mass of the functional layer remaining on the releasable substrate after transfer and therefore superior transferability of the functional layer.

A: M0/M1 ratio is 90% by mass or greater
B: M0/M1 ratio is 80% by mass or greater to less than 90% by mass
C: M0/M1 ratio is 60% by mass or greater to less than 80% by mass
D: M0/M1 ratio is less than 60% by mass <Water Contact Angle of Releasable Substrate>

Using a contact angle meter ("DM-701" from Kyowa Interface Science Co., Ltd.), 3 µl of distilled water was dropped onto the surface of the releasable substrate, and water contact angle)(°) 10 seconds after dropping was measured.

<Low-Temperature Output Characteristics of Secondary Battery>

A spirally wound lithium ion secondary battery with a discharge capacity of 1,000 mAh was manufactured and allowed to stand for 24 hours in the environment of 25° C. The lithium ion battery was then charged at 0.1 C and 4.2V for 5 hours in the environment of 25° C. Voltage V0 at that time was measured. The lithium ion secondary battery was discharged at 1 C in the environment of −10° C., and a voltage measured 15 seconds after the initiation of discharge was recorded as V1. Voltage change ΔV (=V0−V1) was then found and evaluated based on the criteria given below. A smaller voltage change indicates superior low-temperature output characteristics.

A: Voltage change ΔV is 500 mV or less
B: Voltage change ΔV is greater than 500 mV to 700 mV
C: Voltage change ΔV is greater than 700 mV to 900 mV
D: Voltage change ΔV is greater than 900 mV <High-Temperature Cycle Characteristics of Secondary Battery>

The manufactured spirally wound lithium ion secondary battery with a discharge capacity of 1,000 mAh was allowed to stand for 24 hours in the environment of 25° C., and then charged at a constant voltage and constant current of 4.35V and 0.1 C and discharged at a constant current of 0.1 C and 2.75V in the environment of 25° C., and initial capacity C0 was measured. In the environment of 60° C., charging/discharging was then repeated and capacity C1 after 1,000 cycles was measured. % capacity maintenance after cycles of charge and discharge $\Delta C(=(C1/C0)\times 100)$ was calculated and high-temperature cycle characteristics were evaluated based on the criteria below. A higher % capacity maintenance $\Delta C$ indicates superior high-temperature cycle characteristics.

A: % capacity maintenance $\Delta C$ is 85% or greater
B: % capacity maintenance $\Delta C$ is 75% to less than 85%
C: % capacity maintenance $\Delta C$ is less than 75%

Example 1

<Preparation of Organic Particles>

A 5 MPa pressure resistant vessel equipped with a stirrer was charged with, as monomers for core, 75 parts of methyl methacrylate as a (meth)acrylic acid ester monomer, 4 parts of methacrylic acid as an acid-group containing monomer and 1 part of ethylene glycol dimethacrylate as a cross-linkable monomer, 1 part of sodium dodecylbenzene sulfonate as an emulsifier, 150 parts of ion-exchanged water, and 0.5 parts of potassium persulfate as a polymerization initiator. After fully stirred, the temperature was raised to 60° C. to initiate polymerization. When the polymerization conversion rate reached 96%, a mixture of 19 parts of styrene as an aromatic vinyl monomer and 1 part of methacrylic acid as an acid group-containing monomer was then continuously added as monomers for shell, and the reaction mass was heated to 70 C.° to continue polymerization. When the polymerization conversion rate reached 96%, the reaction was quenched by cooling to produce a water dispersion containing organic particles.

The resultant organic particles were measured for ratio of coverage, core-shell ratio, and volume-average particle diameter D50. The polymers of the organic particles were also measured for degree of swelling in electrolysis solution and glass-transition temperature. The results are shown in Table 1 below.

<Preparation of Particulate Polymer for Functional Layer (Acrylic Polymer 1)>

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate, the gas phase was purged with nitrogen gas, and the temperature was raised to 60° C.

In another vessel, 50 parts of ion-exchanged water, 0.5 parts of sodium dodecylbenzenesulfonate as a dispersant, 94 parts of butyl acrylate, 2 parts of acrylonitrile, 2 parts of methacrylic acid, 1 part of N-methylol acrylamide, and 1 part of allyl glycidyl ether were mixed to afford a monomer mixture. The monomer mixture was continuously added to the reactor over 4 hours to effect polymerization. During addition, the temperature was retained at 60° C. for polymerization reaction. After completion of addition, the reaction mass was stirred for a further 3 hours at 70° C., and reaction was quenched to afford a water dispersion containing a particulate polymer for functional layer (acrylic polymer 1).

The resultant particulate polymer for functional layer had a volume-average particle diameter D50 of 0.36 μm and a glass-transition temperature of −35° C.

<Preparation of Non-Aqueous Secondary Battery Functional Layer Composition>

A functional layer composition was obtained by mixing 100 parts in solid content equivalent of the water dispersion containing organic particles, 21 parts in solid content equivalent of the water dispersion containing a particulate polymer for functional layer, and 1 part of wetting agent ("SN366" from SAN NOPCO Ltd.), and adding ion-exchanged water to provide a solid content concentration of 39%. The resultant functional layer composition was measured for surface tension. The result is shown in Table 1.

<Manufacture of Laminate for Non-Aqueous Secondary Battery>

The functional layer composition was applied on a releasable substrate (a) ("PET38AL-5" from Lintec Corporation) and dried at 50° C. for 3 minutes. In this way a laminate for secondary battery having a 1 μm thick functional layer on the releasable substrate (a) was obtained. Using the laminate for secondary battery thus obtained, adhesion strength between the functional layer and releasable substrate, adhesion strength between the functional layer and aluminum foil, and transferability of the functional layer were evaluated. The results are shown in Table 1.

<Manufacture of Negative Electrode Substrate>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a particulate binder (SBR) for negative electrode mixed material layer. After adjusting the pH of the mixture containing a particulate binder to 8 by the addition of 5% sodium hydroxide aqueous solution, unreacted monomers were removed by thermal-vacuum distillation. Thereafter, the mixture was cooled to 30° C. or lower to afford a water dispersion containing a desired particulate binder.

Next, 100 parts of synthetic graphite (volume-average particle diameter D50: 15.6 μm) as a negative electrode active material, 1 part in solid content equivalent of 2% aqueous solution of sodium salt of carboxymethyl cellulose ("MAC350HC" from Nippon Paper Industries Co., Ltd) as a thickening agent and ion-exchanged water were mixed to a solid content concentration of 68%, and mixed for 60 minutes at 25° C. Subsequently, the solid content concentration was adjusted to 62% by the addition of ion-exchanged, and the mixture was further mixed at 25° C. for 15 minutes. To the mixture obtained were added 1.5 parts in solid content equivalent of the water dispersion containing the particulate binder and ion-exchanged water to a final solid content concentration of 52%, and further mixed for 10 minutes. The resultant mixture was subjected to defoaming treatment under reduced pressure to afford a slurry composition for negative electrode with good fluidity.

The negative electrode slurry composition thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the negative electrode mixed material layer is 80 μm in thickness.

<Manufacture of Negative Electrode having Functional Layer (Transfer of Functional Layer to Negative Electrode Substrate)>

A laminate for secondary battery having a releasable substrate and a functional layer was disposed on the negative electrode substrate such that the functional layer contacts the negative electrode mixed material layer. The laminate and the negative electrode substrate were bonded together by being passed through a roll press at 100° C., and then the releasable substrate was separated from the functional layer using a roll. In this way the functional layer was transferred on the negative electrode substrate and thus a negative electrode having a functional layer was obtained. Using the negative electrode, the functional layer was evaluated for adhesion in electrolysis solution. The results are shown in Table 1.

<Manufacture of Positive Electrode>

100 parts of $LiCoO_2$ as a positive electrode active material (volume-average particle diameter D50: 12 μm), 2 parts of acetylene black ("HS-100" from Denka Company Limited) as a conductor, 2 parts in solid content equivalent of polvinylidene difluoride ("#7208" from KUREHA Corporation) as a binder, and N-methyl pyrrolidone were mixed to a total solid content concentration of 70%. These materials were mixed with a planetary mixer to prepare a positive electrode slurry composition.

The positive electrode slurry composition thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a web of positive electrode was obtained. The pre-press web of positive electrode was rolled with a roll press to afford a post-press positive electrode in which the positive electrode mixed material layer is 80 μm in thickness.

<Manufacture of Lithium Ion Secondary Battery>

The post-press positive electrode thus obtained was cut into a 49 cm×5 cm piece and placed with the surface of the positive electrode mixed material layer facing up. A separator ("2500" from Celgard Inc; 25 μm thick) cut into a 55 cm×5.5 cm piece was disposed on the positive electrode. Further, the negative electrode having a functional layer obtained above was cut into a 50 cm×5.2 cm piece and placed on the separator with the surface of the negative electrode mixed material layer facing the separator. This laminate was wound up by a winder into a roll. The roll was pressed at 60° C. under a pressure of 0.5 MPa to into a flat form and enclosed by an aluminum packaging case as a battery outer package. Electrolysis solution (solvent: EC/DEC/VC (mixing ratio: 68.5/30/1.5 (by volume)); electrolyte: 1M $LiPF_6$) was injected so as not to leave air. In order to tightly seal up the opening of the aluminum outer package, the aluminum package was closed by heat sealing at 150° C. In this way, as a non-aqueous secondary battery, a spirally wound lithium ion secondary battery with a discharge capacity of 1,000 mAh was manufactured.

The resultant lithium ion secondary battery was evaluated for low-temperature output characteristics and high-temperature cycle characteristics. The results are shown in Table 1 below.

Examples 2 and 3

Organic particles, particulate polymers for functional layer, functional layer compositions, laminates for secondary battery, negative electrodes having a functional layer, positive electrodes, and lithium ion secondary batteries were produced as in Example 1 except that upon preparation of water dispersions of organic particles the ratios of monomers added for core formation were changed as shown in Table 1 below. Evaluations were made as in Example 1. The results are shown in Table 1 below.

Examples 4 and 5

Organic particles, particulate polymers for functional layer, functional layer compositions, laminates for secondary battery, negative electrodes having a functional layer, positive electrodes, and lithium ion secondary batteries were produced as in Example 1 except that upon preparation of water dispersions of organic particles the types and ratios of monomers added for shell formation were changed as shown in Table 1 below. Evaluations were made as in Example 1. The results are shown in Table 1 below.

Examples 6 and 7

Organic particles, particulate polymers for functional layer, functional layer compositions, laminates for secondary battery, negative electrodes having a functional layer, positive electrodes, and lithium ion secondary batteries were produced as in Example 1 except that upon preparation of functional layer compositions the amounts of particulate polymers for functional layer were changed as shown in Table 1 below. Evaluations were made as in Example 1. The results are shown in Table 1 below.

Example 8

Organic particles, a functional layer composition, a laminate for secondary battery, a negative electrode having a functional layer, a positive electrode, and a lithium ion secondary battery were produced as in Example 1 except that acrylic polymer 1 (particulate polymer for functional layer) was replaced by acrylic polymer 2 prepared as described below. Evaluations were made as in Example 1. The results are shown in Table 1 below.

<Preparation of Particulate Polymer for Functional Layer (Acrylic Polymer 2)>

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate, the gas phase was purged with nitrogen gas, and the temperature was raised to 60° C.

In another vessel, 50 parts of ion-exchanged water, 0.5 parts of sodium dodecylbenzenesulfonate as a dispersant, 56 parts of butyl acrylate, 40 parts of styrene, 2 parts of methacrylic acid, 1 part of N-methylol acrylamide, and 1 part of allyl glycidyl ether were mixed to afford a monomer mixture. The monomer mixture was continuously added to the reactor over 4 hours to effect polymerization. During addition, the temperature was retained at 60° C. for polymerization reaction. After completion of addition, the reaction mass was stirred for a further 3 hours at 70° C., and the reaction was quenched to afford a water dispersion containing a particulate polymer for functional layer (acrylic polymer 2).

The resultant particulate polymer for functional layer had a volume-average particle diameter D50 of 0.3 μm and a glass-transition temperature of −2° C.

Examples 9 and 10

Organic particles, particulate polymers for functional layer, functional layer compositions, laminates for secondary battery, negative electrodes having a functional layer, positive electrodes, and lithium ion secondary batteries were produced as in Example 1 except that upon manufacture of the laminate for secondary battery, the releasable substrate (a) was replaced by a releasable substrate (b) ("Nissha Techsol RX101" from Nissha Printing., Ltd.) or a releasable substrate (c) ("T788" from Daicel Value Coating Ltd.). Evaluations were made as in Example 1. The results are shown in Table 1 below.

Examples 11 and 12

Organic particles, particulate polymers for functional layer, functional layer compositions, laminates for secondary battery, negative electrodes having a functional layer, positive electrodes, and lithium ion secondary batteries were produced as in Example 1 except that upon preparation of the functional layer composition the amount of the wetting agent was changed as shown in Table 1 below. Evaluations were made as in Example 1. The results are shown in Table 1 below.

Comparative Example 1

Organic particles, a particulate polymer for functional layer, a functional layer composition, a laminate for secondary battery, a negative electrode having a functional layer, a positive electrode, and a lithium ion secondary battery were produced as in Example 1 except that upon preparation of a water dispersion of organic particles the ratios of monomers added for core and shell formation were changed as shown in Table 1 below. Evaluations were made as in Example 1. The results are shown in Table 1 below.

Comparative Example 2

Organic particles, a particulate polymer for functional layer, a functional layer composition, a laminate for secondary battery, a negative electrode having a functional layer, a positive electrode, and a lithium ion secondary battery were produced as in Example 1 except that upon preparation of a water dispersion of organic particles the ratios of monomers added for core formation were changed as shown in Table 1 below. Evaluations were made as in Example 1. The results are shown in Table 1 below.

Comparative Example 3

Organic particles, a particulate polymer for functional layer, a functional layer composition, a laminate for secondary battery, a negative electrode having a functional layer, a positive electrode, and a lithium ion secondary battery were produced as in Example 1 except that upon preparation of a water dispersion of organic particles the ratios of monomers added for shell formation were changed as shown in Table 1 below. Evaluations were made as in Example 1. The results are shown in Table 1 below.

Comparative Example 4

Organic particles, a particulate polymer for functional layer, a functional layer composition, a laminate for secondary battery, a negative electrode having a functional layer, a positive electrode, and a lithium ion secondary battery were produced as in Example 1 except that upon manufacture of the laminate for secondary battery, the releasable substrate (a) was replaced by a polyethylene releasable substrate (d). Evaluations were made as in Example 1. The results are shown in Table 1 below.

In Table 1, "MMA" represents methyl methacrylate; "MAA" methacrylic acid; "EDMA" ethylene glycol dimethacrylate; "ST" styrene; "NaSS" sodium styrenesulfonate; "AN" acrylonitrile; "ACL1" acrylic polymer 1; and "ACL2" acrylic polymer 2.

TABLE 1

| | | | | | Example 1 | Example 2 | Example 3 | Example 4 | Example 5 | Example 6 |
|---|---|---|---|---|---|---|---|---|---|---|
| Laminate for secondary battery | Releasable substrate | | Type | | a | a | a | a | a | a |
| | | | Water contact angle [°] | | 98 | 98 | 98 | 98 | 98 | 98 |
| | Organic particles | Core | Degree of swelling in electrolysis solution [fold] | | 9.6 | 5.3 | 28.7 | 9.6 | 9.6 | 9.6 |
| | | | Tg [° C.] | | 91 | 89 | 91 | 91 | 91 | 91 |
| | | | Composition | MMA [parts by mass] | 75 | 71.5 | 75.95 | 75 | 75 | 75 |
| | | | | MAA [parts by mass] | 4 | 4 | 4 | 4 | 4 | 4 |
| | | | | EDMA [parts by mass] | 1 | 4.5 | 0.05 | 1 | 1 | 1 |
| | | Shell | Degree of swelling in electrolysis solution [fold] | | 1.3 | 1.3 | 1.3 | 3.5 | 2.1 | 1.3 |
| | | | Tg [° C.] | | 100 | 100 | 100 | 102 | 83 | 100 |
| | | | Composition | ST [parts by mass] | 19 | 19 | 19 | 4 | — | 19 |
| | | | | NaSS [parts by mass] | — | — | — | — | 15 | — |
| | | | | MAA [parts by mass] | 1 | 1 | 1 | 1 | — | 1 |
| | | | | AN [parts by mass] | — | — | — | 15 | 5 | — |
| | | | | MMA [parts by mass] | — | — | — | — | — | — |
| | | | Core-Shell ratio [%] | | 10 | 10 | 10 | 10 | 10 | 10 |
| | | | Ratio of Coverage [%] | | 63 | 65 | 62 | 63 | 38 | 63 |

TABLE 1-continued

|  |  |  |  |  |  |  |  |  |  |
|---|---|---|---|---|---|---|---|---|---|
|  |  |  | Volume-average particle diameter D50 [μm] | 0.6 | 0.6 | 0.6 | 0.6 | 0.6 | 0.6 |
|  |  |  | Blending amount [parts by mass] | 100 | 100 | 100 | 100 | 100 | 100 |
|  | Binder |  | Type | ACL1 | ACL1 | ACL1 | ACL1 | ACL1 | ACL1 |
|  |  |  | Tg [° C.] | −35 | −35 | −35 | −35 | −35 | −35 |
|  |  |  | Blending amount [parts by mass] | 21 | 21 | 21 | 21 | 21 | 6 |
|  | Wetting agent |  | Blending amount [parts by mass] | 1.0 | 1.0 | 1.0 | 1.0 | 1.0 | 1.0 |
|  | Adhesion strength between functional layer and releasable substrate [N/m] |  |  | 25 | 25 | 24 | 24 | 25 | 12 |
|  | Adhesion strength between functional layer and aluminum foil [N/m] |  |  | 245 | 240 | 240 | 241 | 245 | 126 |
|  | Surface tension of functional layer composition [mN/m] |  |  | 30.5 | 30.5 | 30.5 | 30.5 | 30.5 | 32 |
|  | Functional layer transferability |  |  | A | A | A | A | A | A |
|  | Adhesion in electrolysis solution of functional layer |  |  | A | A | B | B | A | B |
|  | High-temperature cycle characteristics |  |  | A | A | B | B | A | B |
|  | Low-temperature output characteristics |  |  | A | B | A | A | A | A |

|  |  |  |  | Example 7 | Example 8 | Example 9 | Example 10 | Example 11 | Example 12 |
|---|---|---|---|---|---|---|---|---|---|
| Laminate for secondary battery | Releasable substrate |  | Type | a | a | b | c | a | a |
|  |  |  | Water contact angle [°] | 98 | 98 | 72 | 108 | 98 | 98 |
|  | Organic particles | Core | Degree of swelling in electrolysis solution [fold] | 9.6 | 9.6 | 9.6 | 9.6 | 9.6 | 9.6 |
|  |  |  | Tg [° C.] | 91 | 91 | 91 | 91 | 91 | 91 |
|  |  | Composition | MMA [parts by mass] | 75 | 75 | 75 | 75 | 75 | 75 |
|  |  |  | MAA [parts by mass] | 4 | 4 | 4 | 4 | 4 | 4 |
|  |  |  | EDMA [parts by mass] | 1 | 1 | 1 | 1 | 1 | 1 |
|  |  | Shell | Degree of swelling in electrolysis solution [fold] | 1.3 | 1.3 | 1.3 | 1.3 | 1.3 | 1.3 |
|  |  |  | Tg [° C.] | 100 | 100 | 100 | 100 | 100 | 100 |
|  |  | Composition | ST [parts by mass] | 19 | 19 | 19 | 19 | 19 | 19 |
|  |  |  | NaSS [parts by mass] | — | — | — | — | — | — |
|  |  |  | MAA [parts by mass] | 1 | 1 | 1 | 1 | 1 | 1 |
|  |  |  | AN [parts by mass] | — | — | — | — | — | — |
|  |  |  | MMA [parts by mass] | — | — | — | — | — | — |
|  |  |  | Core-Shell ratio [%] | 10 | 10 | 10 | 10 | 10 | 10 |
|  |  |  | Ratio of Coverage [%] | 63 | 63 | 63 | 63 | 63 | 63 |
|  |  |  | Volume-average particle diameter D50 [μm] | 0.6 | 0.6 | 0.6 | 0.6 | 0.6 | 0.6 |
|  |  |  | Blending amount [parts by mass] | 100 | 100 | 100 | 100 | 100 | 100 |
|  | Binder |  | Type | ACL1 | ACL2 | ACL1 | ACL1 | ACL1 | ACL1 |
|  |  |  | Tg [° C.] | −35 | −2 | −35 | −35 | −35 | −35 |
|  |  |  | Blending amount [parts by mass] | 34 | 21 | 21 | 21 | 21 | 21 |
|  | Wetting agent |  | Blending amount [parts by mass] | 1.0 | 1.0 | 1.0 | 1.0 | 0.3 | 4.5 |
|  | Adhesion strength between functional layer and releasable substrate [N/m] |  |  | 48 | 24 | 32 | 14 | 12 | 23 |
|  | Adhesion strength between functional layer and aluminum foil [N/m] |  |  | 332 | 258 | 245 | 245 | 178 | 252 |
|  | Surface tension of functional layer composition [mN/m] |  |  | 28.5 | 32 | 30.5 | 30.5 | 45.5 | 21 |
|  | Functional layer transferability |  |  | B | B | B | A | B | A |
|  | Adhesion in electrolysis solution of functional layer |  |  | B | B | B | B | B | B |
|  | High-temperature cycle characteristics |  |  | B | B | B | B | B | A |
|  | Low-temperature output characteristics |  |  | B | B | B | B | B | B |

|  |  |  |  | Comparative Example 1 | Comparative Example 2 | Comparative Example 3 | Comparative Example 4 |
|---|---|---|---|---|---|---|---|
| Laminate for secondary battery | Releasable substrate |  | Type | a | a | a | d |
|  |  |  | Water contact angle [°] | 98 | 98 | 98 | 65 |
|  | Organic particles | Core | Degree of swelling in electrolysis solution [fold] | 32 | 4.1 | 9.6 | 9.6 |
|  |  |  | Tg [° C.] | 100 | 101 | 91 | 91 |
|  |  | Composition | MMA [parts by mass] | 50 | 45 | 75 | 75 |
|  |  |  | MAA [parts by mass] | 25 | 30 | 4 | 4 |
|  |  |  | EDMA [parts by mass] | 5 | 5 | 1 | 1 |

TABLE 1-continued

|  |  |  |  |  |  |  |
|---|---|---|---|---|---|---|
| | Shell | Degree of swelling in electrolysis solution [fold] | 5.5 | 1.3 | 5.5 | 1.3 |
| | | Tg [° C.] | 98 | 100 | 98 | 100 |
| | Composition | ST [parts by mass] | — | 19 | — | 19 |
| | | NaSS [parts by mass] | — | — | — | — |
| | | MAA [parts by mass] | 1 | 1 | 1 | 1 |
| | | AN [parts by mass] | 9 | — | 9 | — |
| | | MMA [parts by mass] | 10 | — | 10 | — |
| | Core-Shell ratio [%] | | 10 | 10 | 10 | 10 |
| | Ratio of Coverage [%] | | 63 | 63 | 63 | 63 |
| | Volume-average particle diameter D50 [μm] | | 0.6 | 0.6 | 0.6 | 0.6 |
| | Blending amount [parts by mass] | | 100 | 100 | 100 | 100 |
| Binder | Type | | ACL1 | ACL1 | ACL1 | ACL1 |
| | Tg [° C.] | | −35 | −35 | −35 | −35 |
| | Blending amount [parts by mass] | | 21 | 21 | 21 | 21 |
| Wetting agent | Blending amount [parts by mass] | | 1.0 | 1.0 | 1.0 | 1.0 |
| Adhesion strength between functional layer and releasable substrate [N/m] | | | 19 | 23 | 21 | 71 |
| Adhesion strength between functional layer and aluminum foil [N/m] | | | 238 | 237 | 235 | 235 |
| Surface tension of functional layer composition [mN/m] | | | 31.5 | 31.2 | 31.4 | 30.5 |
| Functional layer transferability | | | A | A | A | D |
| Adhesion in electrolysis solution of functional layer | | | C | B | C | C |
| High-temperature cycle characteristics | | | C | C | C | C |
| Low-temperature output characteristics | | | D | D | D | C |

The results of Examples 1 to 12 and Comparative Examples 1 to 4 shown in Table 1 reveal that Examples 1 to 12 wherein a laminate for secondary battery is used that includes 1) a releasable substrate whose water contact angle is at least a specific value and 2) a functional layer which is formed on the releasable substrate and contains organic particles having a specific core-shell structure and a binder provide superior functional layer transferability, as well as allow the functional layer to exert good adhesion in electrolysis solution and the secondary battery to exert superior high-temperature cycle characteristics and superior low-temperature output characteristics.

The results of Examples 1 to 3 shown in Table 1 reveal that adjustment of the monomer composition and degree of swelling in electrolysis solution of the core of organic particles may further improve adhesion in electrolysis solution of a functional layer, and high-temperature cycle characteristics and low-temperature output characteristics of a secondary battery.

The results of Examples 1, 4 and 5 shown in Table 1 reveal that adjustment of the monomer composition and degree of swelling in electrolysis solution of the shell of organic particles may further improve adhesion in electrolysis solution of a functional layer and high-temperature cycle characteristics of a secondary battery.

The results of Examples 1, 6 and 7 shown in Table 1 reveal that changing the amount of the particulate polymer for functional layer as a binder may further improve transferability and adhesion in electrolysis solution of a functional layer, and high-temperature cycle characteristics and low-temperature output characteristics of a secondary battery.

The results of Examples 1 and 8 shown in Table 1 reveal that adjustment of the monomer composition and Tg of the particulate polymer for functional layer as a binder may further improve transferability and adhesion in electrolysis solution of a functional layer, and high-temperature cycle characteristics and low-temperature output characteristics of a secondary battery.

The results of Examples 1, 9 and 10 shown in Table 1 reveal that changing the water contact angle of the releasable substrate may further improve transferability and adhesion in electrolysis solution of a functional layer, and high-temperature cycle characteristics and low-temperature output characteristics of a secondary battery.

The results of Examples 1, 11 and 12 shown in Table 1 reveal that changing the amount of the wetting agent to change the surface tension of the functional layer composition may further improve transferability and adhesion in electrolysis solution of a functional layer, and high-temperature cycle characteristics and low-temperature output characteristics of a secondary battery.

INDUSTRIAL APPLICABILITY

According to the present disclosure, it is possible to provide a laminate for non-aqueous secondary battery which includes a functional layer that has superior transferability and may exert high function in a non-aqueous secondary battery.

According to the present disclosure, it is also possible to provide a method of manufacturing, using the laminate for non-aqueous secondary battery, a non-aqueous secondary battery member that may allow a secondary battery to exert superior electrical characteristics.

REFERENCE SIGNS LIST

100 organic particle
110 core
110S outer surface of core
120 shell

The invention claimed is:

1. A laminate for non-aqueous secondary battery, comprising:
   a releasable substrate; and
   a functional layer adjacently disposed on the releasable substrate, wherein
   the functional layer comprises organic particles and a binder,
   the organic particles each have a core-shell structure having a core and a shell that partially covers an outer surface of the core,
   the core is made of polymer having a degree of swelling (S factor based on weight) in electrolysis solution of 5 times or more to 30 times or less,
   the shell is made of polymer having a degree of swelling (S factor based on weight) in electrolysis solution of greater than 1 time to 4 times or less, and the releasable substrate has a water contact angle of 70° or more, wherein
   the degree of swelling (S factor based on weight) is measured using an electrolysis solution that is obtained by dissolving $LiPF_6$ as a supporting electrolyte into a mixture solvent having an SP value of 12.7 $(cal/cm^3)^{1/2}$ made of ethylene carbonate, diethyl carbonate, and vinylene carbonate with volume mixing ratio of 68.5:30:1.5 at a concentration of 1 mol/L.

2. The laminate, according to claim 1, for non-aqueous secondary battery, wherein the polymer of the core has a glass-transition temperature of 0° C. or more to 150° C. or less, and the polymer of the shell has a glass-transition temperature of 50° C. or more to 200° C. or less.

3. The laminate, according to claim 1, for non-aqueous secondary battery, wherein the binder has a glass-transition temperature of −50° C. or more to 25° C. or less.

4. A method of manufacturing a non-aqueous secondary battery member having a functional layer on a substrate for non-aqueous secondary battery, the method comprising:
   disposing a laminate for non-aqueous secondary battery that includes a releasable substrate and the functional layer adjacently disposed on the releasable substrate such that the functional layer is adjacent to the substrate for non-aqueous secondary battery, and bonding the functional layer to the substrate for non-aqueous secondary battery; and
   peeling the releasable substrate from the functional layer, wherein
   the functional layer comprises organic particles and a binder,
   the organic particles each have a core-shell structure having a core and a shell that partially covers an outer surface of the core,
   the core is made of polymer having a degree of swelling (S factor based on weight) in electrolysis solution of 5 times or more to 30 times or less,
   the shell is made of polymer having a degree of swelling (S factor based on weight) in electrolysis solution of greater than 1 time to 4 times or less, and the releasable substrate has a water contact angle of 70° or more, wherein
   the degree of swelling (S factor based on weight) is measured using an electrolysis solution that is obtained by dissolving $LiPF_6$ as a supporting electrolyte into a mixture solvent having an SP value of 12.7 $(cal/cm^3)^{1/2}$ made of ethylene carbonate, diethyl carbonate, and vinylene carbonate with volume mixing ratio of 68.5:30:1.5 at a concentration of 1 mol/L.

* * * * *